(12) United States Patent
Mitsui et al.

(10) Patent No.: US 10,492,177 B2
(45) Date of Patent: Nov. 26, 2019

(54) BASE STATION AND RADIO TERMINAL

(71) Applicant: KYOCERA CORPORATION, Kyoto (JP)

(72) Inventors: Katsuhiro Mitsui, Ritto (JP); Masato Fujishiro, Yokohama (JP); Noriyoshi Fukuta, Inagi (JP); Kugo Morita, Yokohama (JP); Yushi Nagasaka, Ritto (JP); Akinori Iwabuchi, Machida (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/575,607

(22) PCT Filed: May 20, 2016

(86) PCT No.: PCT/JP2016/065068
§ 371 (c)(1),
(2) Date: Nov. 20, 2017

(87) PCT Pub. No.: WO2016/190254
PCT Pub. Date: Dec. 1, 2016

(65) Prior Publication Data
US 2018/0160416 A1    Jun. 7, 2018

Related U.S. Application Data

(60) Provisional application No. 62/165,315, filed on May 22, 2015.

(30) Foreign Application Priority Data

Jun. 5, 2015  (JP) ................................. 2015-115163
Jul. 29, 2015  (JP) ................................. 2015-150173

(51) Int. Cl.
*H04W 72/04*    (2009.01)
*H04W 36/14*    (2009.01)
(Continued)

(52) U.S. Cl.
CPC ....... *H04W 72/0406* (2013.01); *H04W 24/10* (2013.01); *H04W 36/14* (2013.01);
(Continued)

(58) Field of Classification Search
CPC ... H04W 36/14; H04W 84/12; H04W 84/045; H04W 88/06; H04W 72/0406;
(Continued)

(56) References Cited

U.S. PATENT DOCUMENTS

2006/0109820 A1    5/2006  Miyata
2014/0079022 A1    3/2014  Wang et al.
(Continued)

OTHER PUBLICATIONS

International Search Report issued in PCT/JP2016/065068; dated Jun. 21, 2016.
(Continued)

*Primary Examiner* — Redentor Pasia
(74) *Attorney, Agent, or Firm* — Studebaker & Brackett PC

(57) ABSTRACT

A base station according to an embodiment comprises: a controller configured to receive an identifier of a wireless LAN access point added in a wireless LAN termination apparatus from the wireless LAN termination apparatus.

3 Claims, 25 Drawing Sheets

(51) Int. Cl.
*H04W 84/12* (2009.01)
*H04W 88/06* (2009.01)
*H04W 24/10* (2009.01)
*H04W 88/08* (2009.01)
*H04W 92/10* (2009.01)
*H04W 52/02* (2009.01)

(52) U.S. Cl.
CPC ........... *H04W 84/12* (2013.01); *H04W 88/06* (2013.01); *H04W 52/0216* (2013.01); *H04W 52/0229* (2013.01); *H04W 88/08* (2013.01); *H04W 92/10* (2013.01)

(58) Field of Classification Search
CPC ... H04W 24/10; H04W 48/20; H04L 61/1511; H04L 61/6063
See application file for complete search history.

(56) References Cited

U.S. PATENT DOCUMENTS

| | | | | |
|---|---|---|---|---|
| 2014/0161103 | A1* | 6/2014 | Sirotkin | H04W 24/10 370/332 |
| 2014/0199994 | A1 | 7/2014 | Richards | |
| 2014/0204903 | A1* | 7/2014 | Kim | H04W 48/18 370/331 |
| 2015/0319661 | A1* | 11/2015 | Jung | H04W 36/14 455/436 |
| 2016/0234726 | A1* | 8/2016 | Nuggehalli | H04W 36/0022 |
| 2016/0278138 | A1* | 9/2016 | Chen | H04W 36/0027 |
| 2016/0302122 | A1* | 10/2016 | Masini | H04L 61/1511 |
| 2017/0164419 | A1* | 6/2017 | Kim | H04L 5/00 |
| 2018/0049063 | A1* | 2/2018 | Xu | H04W 28/085 |
| 2018/0084544 | A1* | 3/2018 | Xu | H04W 28/085 |

OTHER PUBLICATIONS

3rd Generation Partnership Project; Technical Specification Group Radio Access Network; Evolved Universal Terrestrial Radio Access (E-UTRA); User Equipment (UE) procedures in idle mode; 3GPP TS 36.304 V12.4.0; Mar. 2015; pp. 1-38; Release 12; 3GPP Organizational Partners.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V13.0.0; Jun. 2015; pp. 1-254; Release 13; 3GPP Organizational Partners.

CMCC (Rapporteur); TR 37.870 update; 3GPP TSG-RAN WG3 Meeting #88; R3-151163; May 25-29, 2015; pp. 1-23; Fukuoka. Japan.

Ericsson; Setting Up the Xw; 3GPP TSG-RAN WG3 #87bis; R3-150740; Apr. 20-24, 2015; pp. 1-4; Tenerife—Santa Cruz, Spain.

Huawei; Further clarification on the identified parameters for UE throughput estimation in WLAN; 3GPP TSG-RAN3 Meeting #87bis; R3-150575; Apr. 20-24, 2015; pp. 1-4; Tenerife—Santa Cruz, Spain.

* cited by examiner

FIG. 23

(A) WT INFORMATION REQUEST

| IE/GROUP NAME | PRESENCE | RANGE | IE TYPE AND REFERENCE |
|---|---|---|---|
| MESSAGE TYPE | M | | 9.2.13 |
| RELATIVE APS LIST | | | |
| >RELATIVE AP INFORMATION | | | |
| >>BSSID | M | | |
| >>SSID | O | | |

(B) WT INFORMATION RESPONSE

| IE/GROUP NAME | PRESENCE | RANGE | IE TYPE AND REFERENCE |
|---|---|---|---|
| MESSAGE TYPE | M | | 9.2.13 |
| WTS LIST | | | |
| >WT ID | M | | IP ADDRESS OR/AND Xw INFORMATION REQUIRED FOR SETUP |
| >>RELATIVE APS LIST | | | |
| >>>RELATIVE AP INFORMATION | | | |
| >>>>BSSID | M | | |

FIG. 27

| IE/GROUP NAME | PRESENCE | RANGE | IE TYPE AND REFERENCE |
|---|---|---|---|
| MESSAGE TYPE | M | | 9.2.13 |
| SERVED CELLS TO ADD | | 0 .. <maxCellineNB> | |
| >SERVED CELL INFORMATION | M | | 9.2.8 |
| >NEIGHBOUR INFORMATION | | 0 .. <maxnoofNeighbourss> | |
| >>ECGI | M | | ECGI 9.2.14 |
| >>PCI | M | | INTEGER (0..503, ...) |
| >>EARFCN | M | | 9.2.26 |
| >>TAC | O | | OCTET STRING (2) |
| >>EARFCN EXTENSION | O | | 9.2.65 |
| SERVED WTS TO ADD | | | |
| >SERVED WT INFORMATION | | | |
| >>WT ID | | | |
| >>>SERVED APS TO ADD | | | |
| >>>>SERVED AP INFORMATION | | | |
| >>>>>BSSID | | | |
| >>>>>SSID | | | |
| >>>>>ESSID | | | |
| >>>>>FREQUENCY INFORMATION | | | |
| SERVED CELLS TO MODIFY | | 0 .. <maxCellineNB> | |
| SERVED CELLS TO DELETE | | 0 .. <maxCellineNB> | |

BASE STATION AND RADIO TERMINAL

TECHNICAL FIELD

The present application relates to a base station and a radio terminal used in a communication system.

BACKGROUND ART

LTE (Long Term Evolution) of which the specifications are designed in 3GPP (3rd Generation Partnership Project), which is a project aiming to standardize a cellular communication technology, supports a cellular/WLAN radio interworking technology in Release 12 and later (see Non Patent Document 1 and 2). With such a technology, a user terminal in an RRC connected state or an RRC idle state performs a bidirectional traffic switching (network selection and traffic steering) between an E-UTRAN and a WLAN.

PRIOR ART DOCUMENT

Non-Patent Document

Non Patent Document 1: 3GPP Technical Specification "TS 36.304 V12.4.0" Mar. 23, 2015
Non Patent Document 2: 3GPP Technical Specification "TS 36.300 V13.0.0" Jul. 8, 2015

SUMMARY OF THE INVENTION

A base station according to an embodiment comprises: a controller configured to receive an identifier of a wireless LAN access point added in a wireless LAN termination apparatus from the wireless LAN termination apparatus.

A base station according to an embodiment comprises: a controller configured to transmit a message for requesting a setup of an Xw interface between the base station and a wireless LAN termination apparatus to the wireless LAN termination apparatus. The controller receives, from the wireless LAN termination apparatus, a response message to the second message. The response message includes a list of identifiers of wireless LAN access points in the wireless LAN termination apparatus.

A radio terminal according to an embodiment comprises: a receiver configured to receive, from a base station, control information for configuring a wireless LAN access point to be measured. The control information includes an identifier for designating the wireless LAN access point.

BRIEF DESCRIPTION OF THE DRAWINGS

FIG. 23 shows an example of a table for describing the operation according to the fifth embodiment.
FIG. 27 shows an example of a table for describing an operation according to the seventh embodiment.

DESCRIPTION OF THE EMBODIMENT

Overview of Embodiment

Figure 1:
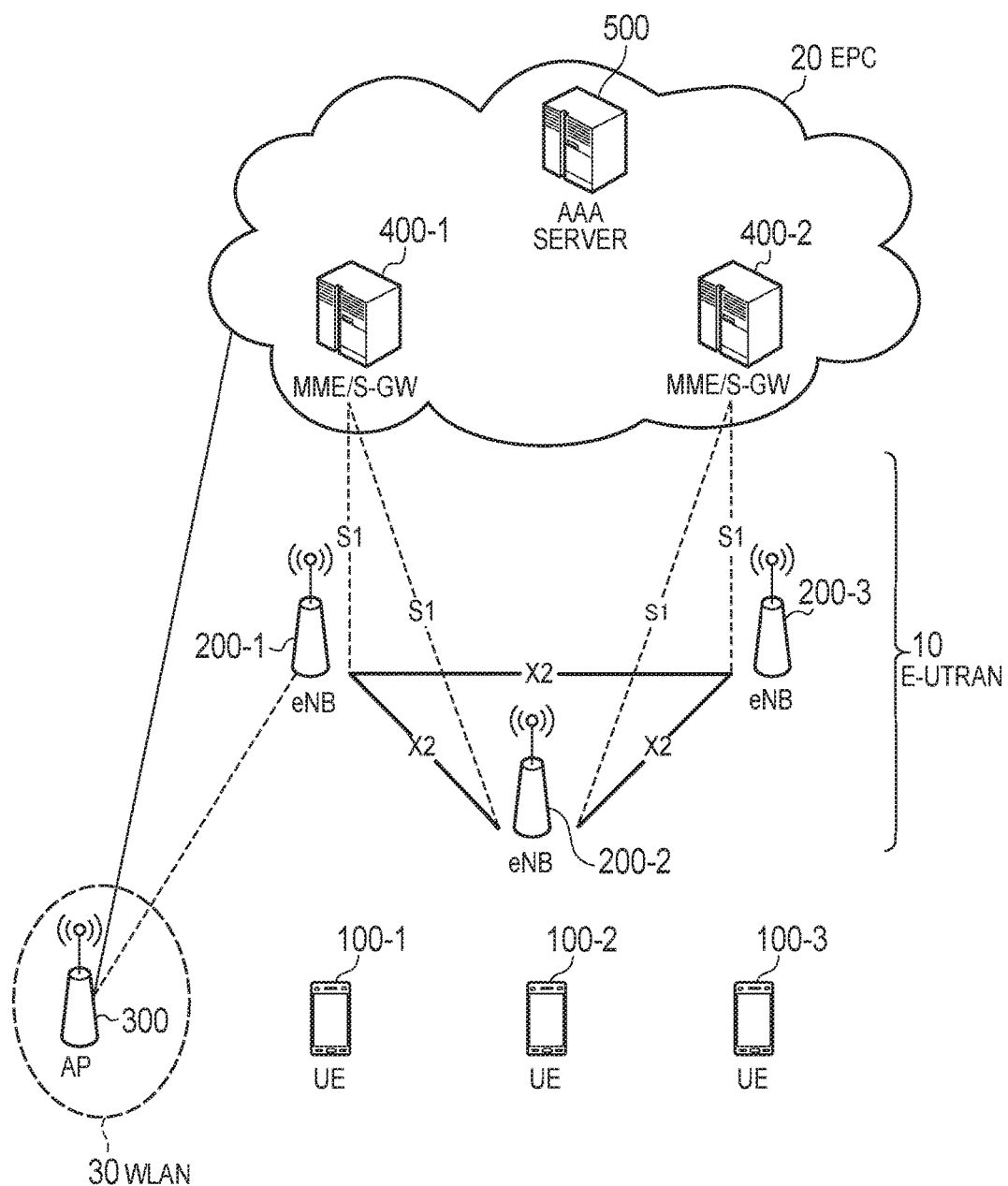
FIG. 1 is a diagram illustrating a system configuration.

A base station according to an embodiment comprises: a controller configured to receive an identifier of a wireless LAN access point added in a wireless LAN termination apparatus from the wireless LAN termination apparatus.

In an embodiment, the controller receives, from the wireless LAN termination apparatus, a message including a list of identifiers of wireless LAN access points, via an Xw interface between the base station and the wireless LAN termination apparatus. The list of wireless LAN access points includes the identifier of the added wireless LAN access point.

In an embodiment, the controller receives an identifier of a wireless LAN access point deleted in the wireless LAN termination apparatus from the wireless LAN termination apparatus.

In an embodiment, the controller receives, from the wireless LAN termination apparatus, a message including a list of identifiers of wireless LAN access points, via an Xw interface between the base station and the wireless LAN termination apparatus. The list of the wireless LAN access points includes the identifier of the deleted wireless LAN access point.

A base station according to an embodiment comprises: a controller configured to transmit a message for requesting a setup of an Xw interface between the base station and a wireless LAN termination apparatus to the wireless LAN termination apparatus. The controller receives, from the wireless LAN termination apparatus, a response message to the second message. The response message includes a list of identifiers of wireless LAN access points in the wireless LAN termination apparatus.

The controller receives, from the wireless LAN termination apparatus, a message including the list of the identifiers of wireless LAN access points, via the Xw interface between the base station and the wireless LAN termination apparatus, and the list of the wireless LAN access points includes an identifier of a changed wireless LAN access point.

A radio terminal according to an embodiment comprises: a receiver configured to receive, from a base station, control information for configuring a wireless LAN access point to be measured. The control information includes an identifier for designating the wireless LAN access point.

In an embodiment, the receiver receives, from the base station, a message for configuring a measurement report on a radio signal from a cell. The message includes the control information.

In the meantime, it is assumed that a base station notifies a radio terminal of a (plurality of) wireless LAN access point(s) which serves as a candidate of traffic switching. The radio terminal selects, from the (plurality of) wireless LAN access point(s) notified from the base station, the wireless LAN access point to be a switching destination of the traffic.

However, there is a possibility that the base station cannot appropriately grasp the candidates of the wireless LAN access point.

A radio terminal according to an embodiment is located within a cell managed by a base station operated by a predetermined network operator. The radio terminal includes a receiver configured to receive a radio signal from a wireless LAN access point, and a controller, only if the wireless LAN access point is determined to be operated by the predetermined network operator, configured to transmit, to the base station, a report on the wireless LAN access point.

Here, "operation" may include not only that the predetermined network operator directly operates the wireless LAN access point, but also the predetermined network operator indirectly operates the wireless LAN access point. A case where the predetermined network operator indirectly operates the wireless LAN access point is, for example, a case where a contract network operator who is contracted with the predetermined network operator operates the wireless LAN access point available to a user terminal.

In an embodiment, the radio signal includes identification information of a PLMN to which the wireless LAN access point belongs. The controller determines that the wireless LAN access point is operated by the predetermined network operator, if the PLMN indicated by the identification information of the PLMN is the same PLMN to which the base station belongs.

In an embodiment, the controller determines that the wireless LAN access point is operated by the predetermined network operator, if at least one of identification information indicating the predetermined network operator and an identifier of a wireless LAN access point associated with the predetermined network operator is included in the radio signal.

In an embodiment, the controller receives, from the base station, control information for designating a wireless LAN access point which is a subject to the report. The controller determines, based on the control information, whether or not the wireless LAN access point from which the radio signal is transmitted is operated by the predetermined network operator.

In an embodiment, the controller regards the wireless LAN access point as the subject to the report, if at least one of a reception time of the radio signal and a received strength thereof exceeds a threshold value.

In an embodiment, the controller transmits, together with the report, identification information of another cell, if receiving a radio signal from the other cell upon reception of the radio signal from the wireless LAN access point.

A base station according to an embodiment is operated by a predetermined network operator. The base station comprises: a receiver configured to receive a report on a wireless LAN access point operated by the predetermined network operator from a radio terminal located within a cell managed by the base station; and a controller configured to transfer the report on the wireless LAN access point to a neighboring base station operated by the predetermined network operator.

In an embodiment, the receiver receives, together with the report on the wireless LAN access point, identification information of another cell received upon the radio terminal receiving a radio signal from the wireless LAN access point. The controller transfers the report on the wireless LAN access point to the neighboring base station configured to manage the other cell.

The base station according to the embodiment further comprises a transmitter configured to transmit control information for designating a wireless LAN access point which is a subject to the report.

To effectively utilize a cellular WLAN interworking technology, introduction of an Xw interface is discussed (see 3GPP contribution "R3-150740"). Specifically, between a base station and a wireless LAN termination apparatus (WT: Wireless LAN Termination) that is a node in the WLAN, the Xw interface is set. The base station can obtain, for example, information on the WLAN (information on an AP in the cell or the like) from the wireless LAN termination apparatus via the Xw interface.

Here, it is assumed a case where the base station receives a report about a wireless LAN access point from a radio terminal. In this case, if the radio terminal reports an unknown wireless LAN access point to the base station, the base station does not know the wireless LAN termination apparatus configured to manage the wireless LAN access point, and thus, it may not be possible to set the Xw interface with an appropriate wireless LAN termination apparatus.

A communication control method according to the embodiment is used in a communication system capable of setting an interface between a base station and a wireless LAN termination apparatus that is a node in a wireless LAN. In the communication control method, the radio terminal reports identification information of a predetermined wireless LAN access point to the base station. The base station transmits, based on the identification information of the predetermined wireless LAN access point, an inquiry about a predetermined wireless LAN termination apparatus configured to manage the predetermined wireless LAN access point, to a network apparatus. The network apparatus transmits a response to the inquiry to the base station.

In an embodiment, the base station holds a table in which the wireless LAN termination apparatus and a wireless LAN access point managed by the wireless LAN termination apparatus are associated. The base station transmits the inquiry while using the wireless LAN termination apparatus in the table as the network apparatus.

In an embodiment, the radio terminal reports, to the base station, identification information of a network to which the predetermined wireless LAN access point belongs in addition to the identification information of the predetermined wireless LAN access point, and the base station transmits the inquiry while using, as the network apparatus, a wireless LAN termination apparatus configured to manage another wireless LAN access point associated with the identification information of the network.

In an embodiment, the network apparatus is an upper node of the base station, the network apparatus receives, from a predetermined wireless LAN termination apparatus, identification information of a wireless LAN access point managed by the predetermined wireless LAN termination apparatus, and the network apparatus transmits, based on the identification information of the wireless LAN access point received from the predetermined wireless LAN termination apparatus, a response to the inquiry.

In an embodiment, the network apparatus is an upper node of the base station, and the network apparatus includes an instruction for setting an interface between the base station and the predetermined wireless LAN termination apparatus into the response to the inquiry, and transmits the response to the base station.

In an embodiment, the base station sets a wireless LAN access point to be reported, to the radio terminal, and the radio terminal reports, to the base station, not only the identification information of the wireless LAN access point be reported, but also identification information of another wireless LAN access point.

In an embodiment, if determining that the other wireless LAN access point is operated by a network operator operating the base station, the radio terminal reports the identification information of the other wireless LAN access point, to the base station.

In an embodiment, the radio terminal transmits a radio signal for requesting the identification information of the wireless LAN access point, and the radio terminal receives a response including the identification information of the predetermined wireless LAN access point from the predetermined wireless LAN access point.

In an embodiment, the predetermined wireless LAN access point is a stealth access point from which a radio signal including identification information associated with the predetermined wireless LAN access point is not transmitted.

In an embodiment, this is used in a communication system in which an interface can be set between a base station and a wireless LAN termination apparatus that is a node in a wireless LAN. In the communication control method, the wireless LAN termination apparatus transmits, to the base station, identification information of a wireless LAN access point managed by the wireless LAN termination apparatus. The base station associates, based on the identification information of the wireless LAN access point, the wireless LAN access point and the wireless LAN termination apparatus, and stores the association.

In an embodiment, the wireless LAN termination apparatus transmits, if the wireless LAN access point is newly registered as a wireless LAN access point to be managed by the wireless LAN termination apparatus, the identification information of the wireless LAN access point, to the base station.

In an embodiment, a radio terminal transmits identification information associated with the base station, via the wireless LAN access point, to the wireless LAN termination apparatus, and the wireless LAN termination apparatus transmits, based on the identification information associated with the base station, the identification information of the wireless LAN access point to the base station.

In an embodiment, this is used in a communication system in which an interface can be set between a base station and a wireless LAN termination apparatus that is a node in a wireless LAN. The radio terminal includes: a receiver configured to receive, from a wireless LAN access point, identification information of the wireless LAN termination apparatus configured to manage the wireless LAN access point; and a controller configured to report not only identification information of the wireless LAN access point but also the identification information of the wireless LAN termination apparatus, to the base station.

In an embodiment, the receiver receives, from the wireless LAN access point, a radio signal including the identification information of the wireless LAN access point and the identification information of the wireless LAN termination apparatus.

In an embodiment, the controller transmits, to the wireless LAN access point, a request for the identification information of the wireless LAN termination apparatus, and the receiver receives, from the wireless LAN access point, a response to the request including the identification information of the wireless LAN termination apparatus.

A base station according to the embodiment includes a controller configured to transmit, to another base station, a WT identifier for identifying a wireless LAN termination node together with an AP identifier for identifying a wireless LAN access point managed by the wireless LAN termination node.

In an embodiment, the controller transmits, if the wireless LAN access point is located within coverage of the other base station, the WT identifier together with the AP identifier, to the other base station.

In an embodiment, the controller receives, from the other base station, an inquiry about the wireless LAN termination node including the AP identifier. The controller includes the WT identifier and the AP identifier into a response to the inquiry, and transmits the response to the other base station.

In an embodiment, the controller receives, from the other base station, an inquiry about a wireless LAN termination node including a second AP identifier for identifying a predetermined wireless LAN access point. The controller transmits, if not knowing a second WT identifier for identifying a predetermined wireless LAN termination node configured to manage the predetermined wireless LAN access point, a response including information indicating not knowing the second WT identifier, to the other base station.

In an embodiment, the controller receives, from the other base station, an inquiry about a wireless LAN termination node including a second AP identifier for identifying a predetermined wireless LAN access point. The controller inquires, if not knowing a second WT identifier for identifying a predetermined wireless LAN termination node configured to manage the predetermined wireless LAN access point, another node of the second WT identifier.

In an embodiment, the controller receives, from a radio terminal having detected the wireless LAN access point, a report including the AP identifier and a cell identifier that is identification information of a cell detected when the wireless LAN access point is detected, from the radio terminal. The controller transmits the WT identifier together with the AP identifier to the other base station configured to manage the cell indicated by the cell identifier.

In an embodiment, the controller receives, from the radio terminal, a report including the AP identifier and the cell identifier recorded when the radio terminal is in an idle state.

In an embodiment, the controller omits, if determining that the other base station knows the wireless LAN termination node configured to manage the wireless LAN access point, transmitting the WT identifier and the AP identifier to the other base station.

In an embodiment, the controller omits, if the other base station is not an adjacent base station, transmitting the WT identifier and the AP identifier to the other base station.

In an embodiment, the controller transmits, if not knowing the wireless LAN termination node configured to manage the wireless LAN access point, the report to a node in a core network.

In an embodiment, the controller receives the WT identifier and the AP identifier from the wireless LAN termination node. The controller transmits the WT identifier and the AP identifier received from the wireless LAN termination node, to the other base station.

In an embodiment, the controller receives, triggered by an update of a list about a wireless LAN access point in the wireless LAN termination node, the WT identifier and the AP identifier from the wireless LAN termination node.

A base station according to the embodiment includes a controller configured to receive from, another base station, a WT identifier for identifying a wireless LAN termination node together with an AP identifier for identifying a wireless LAN access point managed by the wireless LAN termination node.

In an embodiment, the controller updates, based on the AP identifier and the WT identifier, a list of the wireless LAN access point managed by the wireless LAN termination node.

In an embodiment, the controller updates the list, based on a report on the wireless LAN access point received from at least any one of a radio terminal, the other base station, and the wireless LAN termination node.

First Embodiment

A case in which an LTE system, which is a cellular communication system configured in compliance with the 3GPP standards, can be linked with a wireless LAN (WLAN) system will be exemplified and described below with reference to drawings.

(System Configuration)

FIG. 1 is a diagram illustrating a system configuration. As illustrated in FIG. 1, the LTE system includes a plurality of UEs (User Equipment) 100, an E-UTRAN (Evolved Universal Terrestrial Radio Access Network) 10, and an EPC (Evolved Packet Core) 20.

The E-UTRAN 10 corresponds to a cellular RAN. The EPC 20 corresponds to a core network. The E-UTRAN 10 and the EPC 20 configure a network of the LTE system.

The UE 100 is a mobile radio communication device. The UE 100 corresponds to a user terminal (a radio terminal). The UE 100 is a terminal that supports both communication schemes of cellular communication and WLAN communication (dual terminal). It is noted that the UE 100 may be a terminal that only supports the cellular communication.

The E-UTRAN 10 includes a plurality of eNBs 200 (evolved Node-Bs). The eNB 200 corresponds to a base station. The eNB 200 manages one or a plurality of cells, and performs radio communication with the UE 100 that exists in the cell of the eNB 200. The "cell" is used as a term indicating a smallest unit of a radio communication area, and is also used as a term indicating a function (resource) of performing radio communication with the UE 100. The eNB 200 has a radio resource management (RRM) function, a routing function of user data, a measurement control function for mobility control and scheduling, and the like.

The eNBs 200 are connected mutually via an X2 interface. The eNB 200 is connected, via an S1 interface, to an MME (Mobility Management Entity)/S-GW (Serving-Gateway) 400 included in the EPC 20.

The EPC 200 includes a plurality of MME/S-GWs 400 and an AAA server 500. The MME is a network node for performing, for example, various types of mobility controls for the UE 100, and corresponds to a controller. The S-GW is a network node that performs control to transfer user data and corresponds to a mobile switching center. The AAA server 400 is a server device that performs authentication, authorization, and accounting.

A WLAN 30 includes a WLAN access point (hereinafter, referred to as "AP") 300. The AP 300 is an AP (Operator controlled AP) managed by the NW operator of the LTE system, for example.

The WLAN 30 is configured to comply with standards of IEEE 802.11, for example. The AP 300 performs WLAN communication with the UE 100 in a frequency band different from a cellular frequency band. Generally, the WLAN communication is performed through an unlicensed band. The cellular communication is performed through a licensed band. The AP 300 is connected to the EPC 20 via a router, and the like. In addition to a case where the eNB 200 and the AP 300 are separate nodes, there may be a case the eNB 200 and the AP 300 are "Collocated" as the identical node. Alternatively, the eNB 200 and the AP 300 may be mutually connected via a direct interface.

It is noted that, the EPC 20 may further include an ANDSF (Access Network Discovery and Selection Function) server. The ANDSF server manages ANDSF information on the WLAN 30. The ANDSF server provides the ANDSF information on the WLAN 30.

(Basic Operation of Terminal-Based Switching Control)

In 3GPP Release 12 and later, a cellular/WLAN radio interworking technology is supported. With such a technology, the UE 100 in the RRC connected state or the RRC idle state performs a bidirectional traffic switching (network selection and traffic steering) between the E-UTRAN 10 and the WLAN 30.

The traffic switching is performed at the initiative of the UE 100 (UE based) with an aid of the E-UTRAN 10. Further, the traffic switching is performed in an APN (Access Point Name) unit. Hereinafter, such switching control is referred to as "UE-based switching control".

The E-UTRAN 10 transmits, to the UE 100, assistance information (RAN assistance parameters) by a broadcast RRC signaling or a dedicated RRC signaling. The broadcast RRC signaling, for example, is an SIB (System Information Block). The dedicated RRC signaling, for example, is an RRC Connection Reconfiguration message.

The assistance information includes: a strength (received power) threshold value and a quality threshold value of an E-UTRAN signal; a threshold value of a WLAN channel usage rate; a threshold value of a WLAN backhaul data rate; a strength (received power) threshold value and a quality threshold value of a WLAN signal; and the like. The assistance information may include a WLAN identifier that is a target of the UE-based switching control. The WLAN identifier is an SSID (Service Set Identifier), BSSID (Basic Service Set Identifier), HESSID (Homogenous Extended Service Set Identifier), and the like. The assistance information may include a parameter that designates a period during which a threshold value (determination condition) should be satisfied.

The UE 100 configured to support the UE-based switching control receives the assistance information and stores the received assistance information. Upon performing a cell reselection or a handover, the UE 100 may discard the stored assistance information.

Next, the UE 100 performs the UE-based switching control.

First of all, an example of a switching from the cellular communication to the WLAN communication, that is, a switching from the E-UTRAN 10 to the WLAN 30 will be described. The UE 100 performs, based on a first determination condition regarding the cellular and a second determination condition regarding the WLAN, a switching determination regarding whether or not to switch from the cellular communication to the WLAN communication. Specifically, if both the first determination condition and the second determination condition are satisfied, the UE 100 performs the switching from the cellular communication to the WLAN communication.

RSRPmeas<$Thresh_{ServingOffloadWLAN, LowP}$; or
RSRQmeas<$Thresh_{ServingOffloadWLAN, LowQ}$;

Here, "RSRPmeas" is a received power of a cellular reception signal, i.e., a reference signal received power (RSRP) measured at the UE 100. "RSRQmeas" is a reception quality of a cellular reception signal, i.e., a reference signal reception quality (RSRQ) measured at the UE 100. "ThreshServingOffloadWLAN, LowP" and "ThreshServingOffloadWLAN, LowQ" are included in the assistance information, and are threshold values for switching to the WLAN 30.

The second determination condition is the following conditions for a target WLAN:

ChannelUtilizationWLAN<$Thresh_{ChUtilWLAN, Low}$; and
BackhaulRateDlWLAN>$Thresh_{BackhRateDLWLAN, High}$; and
BackhaulRateUlWLAN>$Thresh_{BackhRateULWLAN, High}$; and
BeaconRSSI>$Thresh_{BeaconRSSIWLAN, High}$;

Here, "ChannelUtilizationWLAN" is included in a WLAN beacon or a probe response, and indicates a WLAN channel usage rate, i.e., a WLAN radio load level. "BackhaulRateDlWLAN" and "BackhaulRateUlWLAN" are provided from an ANQP (Access Network Query Protocol), and indicate an available transmission rate of WLAN backhaul, i.e., a WLAN backhaul load level. "BeaconRSSI" indicates reception signal intensity of a beacon signal measured at the UE 100. "$Thresh_{ChUtilWLAN, Low}$", "$Thresh_{BackhRateDLWLAN, High}$", "$Thresh_{BackhRateULWLAN, High}$", and "$Thresh_{BeaconRSSIWLAN, High}$" are included in the assistance information, and are threshold values for switching to the WLAN 30.

It is noted that when performing the switching from the cellular communication to the WLAN communication, the UE 100 notifies an upper station (upper layer: higher layer/upper layer) configured to perform bidirectional traffic switching control between the E-UTRAN 10 and the WLAN 30 of, together with (a list (list of WLAN identifiers) of) identifiers of the AP 300 (WLAN identifier) that satisfies the second determination condition, information indicating the traffic switching to the WLAN communication (move-traffic-to-WLAN indication). Specifically, an AS layer in the UE 100 notifies an NAS layer in the UE 100 of the WLAN identifier (and the information), and the NAS layer in the UE 100 uses an NAS procedure to notify the upper station (MME). The UE 100 executes control, based on an instruction from the upper station that receives the notification of the WLAN identifier, of switching from the cellular communication to the WLAN communication (switching from a communication route through the eNB 200 to a communication route through the AP 300).

Next, an example of a switching from the WLAN communication to the cellular communication, that is, a switching from the WLAN 30 to the E-UTRAN 10 will be described. The UE 100 performs, based on a third determination condition regarding the cellular and a fourth determination condition regarding the WLAN, a switching determination regarding whether or not to switch from the WLAN communication to the cellular communication. Specifically, if one of the third determination condition and the fourth determination condition is satisfied, the UE 100 performs the switching from the WLAN communication to the cellular communication.

The third determination condition is the following conditions for an E-UTRAN target cell:

RSRPmeas>$Thresh_{ServingOffloadWLAN, HighP}$; and
RSRQmeas>$Thresh_{ServingOffloadWLAN, HighQ}$;

Here, "$Thresh_{ServingOffloadWLAN, HighP}$" and "$Thresh_{ServingOffloadWLAN, HighQ}$" are included in the assistance information, and are threshold values for switching to the E-UTRAN 10.

The fourth determination condition is the following conditions for a source WLAN:

ChannelUtilizationWLAN>$Thresh_{ChUtilWLAN, High}$; or
BackhaulRateDlWLAN<$Thresh_{BackhRateDLWLAN, Low}$; or
BackhaulRateUlWLAN<$Thresh_{BackhRateULWLAN, Low}$; or
BeaconRSSI<$Thresh_{BeaconRSSIWLAN, Low}$;

Here, "$Thresh_{ChUtilWLAN, High}$", "$Thresh_{BackhRateDLWLAN, Low}$", "$Thresh_{BackhRateULWLAN, Low}$", and "$Thresh_{BeaeonRSSIWLAN, Low}$" are included in the assistance information, and are threshold values for switching to the E-UTRAN 10.

(Radio Terminal)

Figure 2:
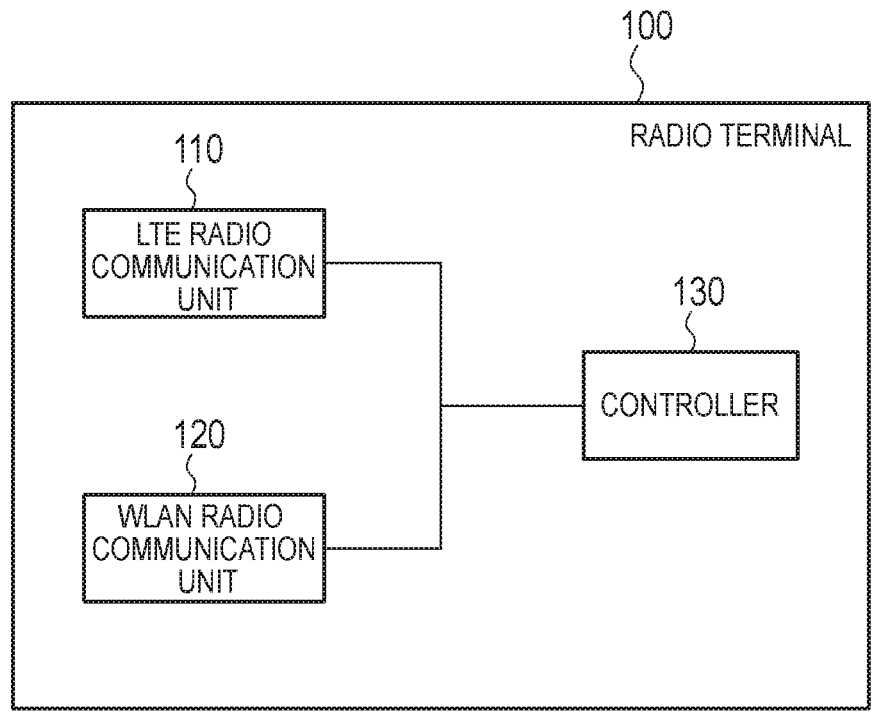
FIG. 2 is a block diagram illustrating a UE 100.

A radio terminal according to the embodiment will be described, below. FIG. 2 is a block diagram illustrating the UE 100 according to the embodiment.

As illustrated in FIG. 2, the UE 100 includes an LTE radio communication unit 110, a WLAN radio communication unit 120, and a controller 130.

The LTE radio communication unit 110 has a function of performing radio communication with the eNB 200. The LTE radio communication unit 110 is configured by a radio transceiver, for example. The radio transceiver may be configured by a transmitter unit and a receiver unit. The LTE radio communication unit 110 transmits and receives radio signals (cellular signals) to and from the eNB 200. The LTE radio communication unit 110 regularly receives a reference signal from the eNB 200, for example. The LTE radio communication unit 110 can measure the signal level of the reference signal (RSRP) and the signal quality of the reference signal (RSRQ). The LTE radio communication unit 110 can receive assistance information from the eNB 200.

The WLAN radio communication unit 120 has a function of performing radio communication with the AP 300. The WLAN radio communication unit 120 is configured by the radio transceiver, for example. The radio transceiver may be configured by a transmitter unit and a receiver unit. The WLAN radio communication unit 120 transmits and receives radio signals (WLAN signals) to and from the AP 300. For example, the WLAN radio communication unit 120 receives, from the AP 300, a beacon signal as the radio signal. Further, the WLAN radio communication unit 120 can measure a signal intensity of the received signal (RSSI).

The controller 130 is configured by a CPU (processor) and a memory, and the like, and controls the UE 100. Specifically, the controller 130 controls the LTE radio communication unit 110 and the WLAN radio communication unit 120. It is noted that a memory configuring the controller 130 may function as a storage unit, and in addition to the memory configuring the controller 130, a memory configuring the storage unit may be provided. The controller 130 may be configured by a controller. Further, the controller 130 executes various types of processes and various types of communication protocols described later.

(Radio Base Station)

Figure 3:
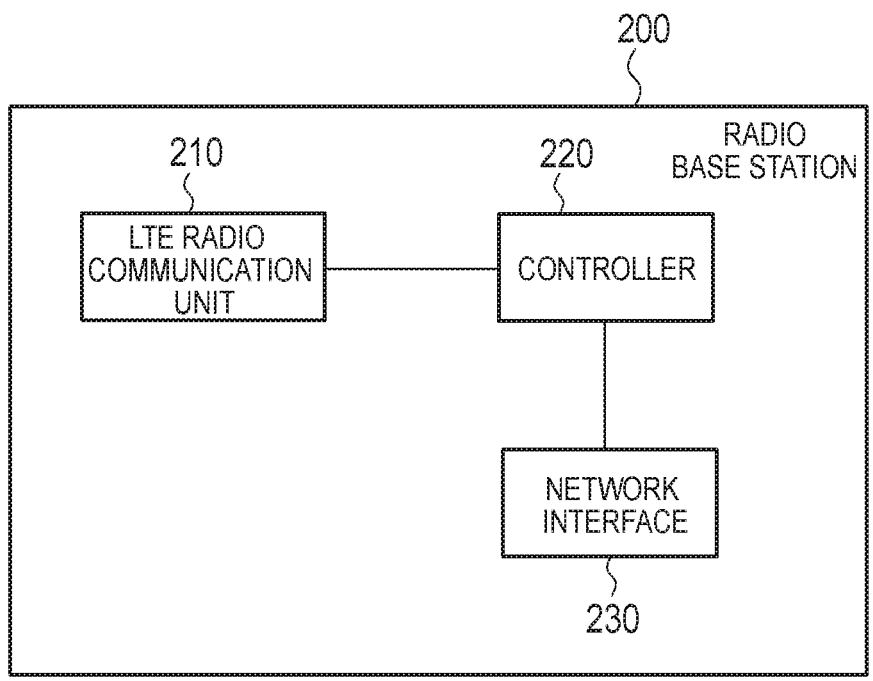
FIG. 3 is a block diagram illustrating an eNB 200.

The radio base station according to the embodiment will be described, below. FIG. 3 is a block diagram illustrating the eNB 200 according to the embodiment.

As illustrated in FIG. 3, the eNB 200 has an LTE radio communication unit 210, a controller 220, and a network interface 230.

The LTE radio communication unit 210 has a function of performing radio communication with the UE 100. The LTE radio communication unit 210 is configured by a radio transceiver, for example. The radio transceiver may be configured by a transmitter unit and a receiver unit. The LTE radio communication unit 210 transmits and receives radio signals (cellular signals) to and from the UE 100. The LTE radio communication unit 210, for example, regularly transmits the reference signal to the UE 100. Further, the LTE radio communication unit 210 can transmit the assistance information to the UE 100. Further, the LTE radio communication unit 210 can transmit a list of WLAN identifiers indicating a wireless LAN access point which serves as a candidate of traffic switching.

The controller 220 is configured by a CPU (processor) and a memory, and the like, and controls the eNB 200. Specifically, the controller 220 controls the LTE radio communication unit 210 and the network interface 130. It is noted that a memory configuring the controller 220 may function as a storage unit, and in addition to the memory configuring the controller 220, a memory configuring the storage unit may be provided. The controller 220 may be configured by the controller. Further, the controller 220 executes various types of processes and various types of communication protocols described later.

The network interface 230 is connected to other base station (for example, a neighboring base station) via the X2 interface, and is connected to the MME/S-GW via the S1 interface. The network interface 230 is used in communication performed on the X2 interface and communication performed on the S1 interface. Further, the network interface 230 may be connected, via a predetermined interface, to the AP 300. The network interface 230 is used for communication with the AP 300.

(Access Point)

Figure 4:
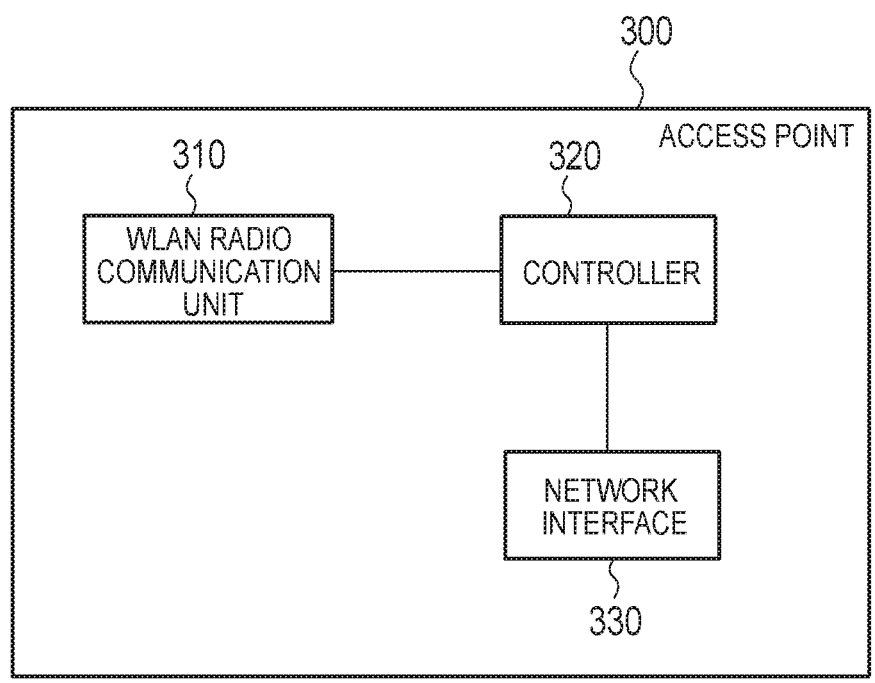
FIG. 4 is a block diagram illustrating an AP 300.

Hereinafter, the AP 300 according to the embodiment will be described. FIG. 4 is a block diagram illustrating the AP 300 according to the embodiment.

As illustrated in FIG. 4, the AP 300 has a WLAN radio communication unit 310, a controller 320, and a network interface 330.

The WLAN radio communication unit 310 has a function of performing radio communication with the UE 100. The WLAN radio communication unit 310 is configured by the radio transceiver, for example. The radio transceiver may be configured by a transmitter unit and a receiver unit. The WLAN radio communication unit 310 transmits and receives radio signals (WLAN signals) to and from the UE 100. The WLAN radio communication unit 310, for example, transmits and receives radio signals (WLAN signals) to and from the UE 100. For example, the WLAN radio communication unit 310 transmits the beacon signal as the radio signal.

The controller 320 is configured by a CPU (processor) and a memory, and the like, and controls the AP 300. Specifically, the controller 320 controls the WLAN radio communication unit 310 and the network interface 330. It is noted that a memory configuring the controller 220 may function as a storage unit, and in addition to the memory configuring the controller 320, a memory configuring the storage unit may be provided. The controller 320 may be configured by the controller. Further, the controller 320 executes various types of processes and various types of communication protocols described later.

The network interface 330 is connected, via the predetermined interface, to a backhaul. The network interface 330 is used for communication with the eNB 200. The network interface 330 may be directly connected, via the predetermined interface, to the eNB 200.

(Operation According to Embodiment)

Figure 5:
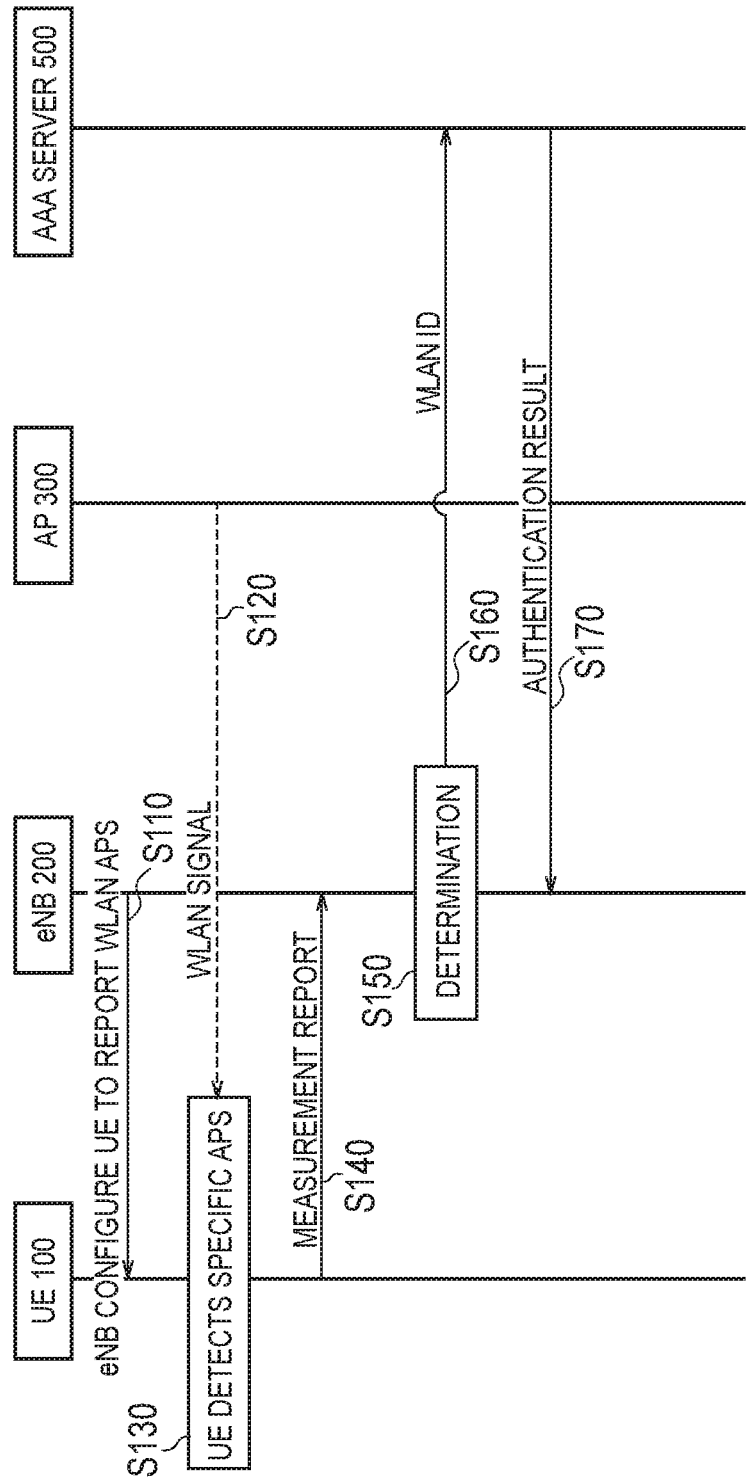
FIG. 5 is a diagram for describing an operation according to a first embodiment.

Next, an operation according to the embodiment will be described by using FIG. 5. FIG. 5 is a diagram for describing the operation according to the embodiment.

It is noted that, the below described process (operation) executed by the UE 100 is executed by at least any one of the LTE radio communication unit 110, the WLAN radio communication unit 120, and the controller 130 included in the UE 100, however, it is described as a process executed by the UE 100 for the purpose of convenience. Similarly, the below-described process (operation) executed by the eNB 200 is executed by at least any one of the LTE radio communication unit 210, the controller 220, and the network interface 230 included in the eNB 200, however, it is described as a process executed by the eNB 200 for the purpose of convenience.

Further, similarly, the below-described process (operation) executed by the AP 300 is executed by at least any one of the WLAN radio communication unit 310, the controller 320, and the network interface 330 included in the AP 300, however, it is described as a process executed by the AP 300 for the purpose of convenience.

In an initial state in FIG. 5, the UE 100 is located in a cell managed by the eNB 200. The UE 100 is in the RRC connected state. Alternatively, the UE 100 is in the RRC idle state and transitions to the RRC connected state, before the process in step S110 is executed.

The AP 300 is an entity of the wireless LAN located in the neighborhood of the eNB 200. The AP 300 may be located in the cell managed by the eNB 200. Further, the AP 300 has a coverage area. The AP 300 provides the UE 100 located in the coverage area with a wireless LAN service. The coverage area of the AP 300 overlaps at least a part of the coverage area configured by the cell (the coverage area that the eNB 200 has). Generally, the coverage area of the AP 300 is smaller than the coverage area of the cell.

Hereinafter, description proceeds on the assumption that the network operator operating the eNB 200 and the network operator operating the AP 300 are identical. Therefore, the eNB 200 and the AP 300 belong to an identical PLMN (Public Land Mobile Network).

As illustrated in FIG. 5, in step S110, the eNB 200 configure the UE 100 to report the AP 300 (WLAN AP). The eNB 200 transmits the control information for designating the AP 300 that is a target to be reported on the AP 300. The UE 100 receives the control information. The number of APs 300 that are targets to be reported is limited by the control information.

The eNB 200 can transmit the control information by unicast. For example, the eNB 200 includes the control information in a message (MeasConfig) for configuring a measurement report on the radio signal from the cell, and transmits the message to the UE 100. The eNB 200 may include the control information in "MeasObjectToAddModList" in "MeasConfig". Alternatively, the eNB 200 may transmit the control information by broadcast. The eNB 200 may transmit, for example, the control information to the UE 100 in the cell of the eNB 200, by SIB (system information block).

The control information can include, for example, identification information capable of designating the PLMN to which the eNB 200 (a serving cell) belongs (PLMN ID, ECGI (E-UTRAN Cell Global ID, and the like)). The control information may include identification information indicating a predetermined network operator. For example, the identification information indicating the predetermined network operator is an MNC (Mobile Network Code) indicating a carrier code, other identification information (ENUMRATED) assigned to each network operator, and the like. Alternatively, the control information may include an identifier of the AP 300 associated with the predetermined network operator. For example, the identifier of the AP 300 associated with the predetermined network operator is an SSID (Service Set Identifier) at least a part of which is configured by a bit string commonly set by the AP 300 operated by the predetermined network operator.

Further, the control information may include at least any one of a threshold value of a reception time of the radio signal from the AP 300 (hereinafter, a first threshold value) and a threshold value of the signal intensity of the radio signal (RSSI) from the AP 300 (hereinafter, a second threshold value). The UE 100 considers, if the reception time of the radio signal from the AP 300 exceeds the first threshold value, the AP 300 as a target to be reported described later. The first threshold value may be a timer. The UE 100 can start, if the radio signal from the AP 300 is received, the timer, and consider, if the radio signal from the AP 300 has been received until the timer expires, the AP 300 as a target to be reported. The timer may be a timer different from TTT (Time To Trigger). Further, the UE 100 considers, if the signal intensity of the radio signal from the AP 300 exceeds the second threshold value, the AP 300 as a target to be reported. Further, the UE 100 may start, if the reception time of the radio signal from the AP 300 exceeds the first threshold value, measurement on the radio signal (measurement of the RSSI, and the like).

The UE 100 can start, based on the control information, monitoring (reception) of the radio signal from the AP 300.

In step S120, the AP 300 transmits the radio signal (WLAN signal) including the identification information capable of designating the network operator operating the AP 300. The UE 100 receives the radio signal from the AP 300.

For example, the AP 300 transmits the radio signal including the identifier of the AP 300 associated with the predetermined network operator. Alternatively, the AP 300 may transmit, a beacon signal including, in a field arbitrarily configurable by the network operator, the identification information to identify the network operator operating the AP 300, as the radio signal. The identification information is, for example, identification information of the PLMN to which the AP 300 belongs, identification information indicating the network operator operating the AP 300, and the like. These pieces of identification information are information similar to the information included in the above-described control information.

The UE 100 may receive, upon receiving the radio signal from the AP 300, the radio signal from other cell.

In step S130, the UE 100 upon receiving the radio signal from the AP 300 determines whether or not the AP 300 as a transmission source of the radio signal is operated by the network operator (hereinafter, specific NW operator) operating the eNB 200. Specifically, the UE 100 determines by at least any one of the following methods.

In a first method, the UE 100 determines, if the PLMN indicated by the identification information of the PLMN to which the AP 300 belongs is identical to the PLMN to which the eNB 200 (serving cell) belongs, that the AP 300 is operated by the specific NW operator.

In a second method, the UE 100 determines, if the network operator indicated by the identification information indicating the network operator operating the AP 300 is the specific NW operator, that the AP 300 is operated by the specific NW operator. That is, the UE 100 determines, if the identification information indicating the specific NW operator is included in the radio signal from the AP 300, that the AP 300 is operated by the specific NW operator.

In a third method, the UE 100 determines, if the identifier of the AP 300 is associated with the specific NW operator, that the AP 300 is operated by the specific NW operator. In other words, the UE 100 determines, if the identifier of the AP 300 associated with the specific NW operator is included in the radio signal from the AP 300, that the AP 300 is operated by the specific NW operator.

It is noted that, the UE 100 may start the determination, if the reception time of the radio signal from the AP 300 exceeds the first threshold value. Alternatively, the UE 100 may start the determination, if the signal intensity of the radio signal from the AP 300 exceeds the second threshold value. Considering the measurement load of the reception time and the signal intensity, after terminating the determination, the UE 100 preferably starts measurement on the radio signal (measurement of the reception time, the RSSI, and the like) or compares the measurement result (the measurement result of the reception time, the RSSI, and the like) with the threshold value (the first threshold value, the second threshold value).

The UE 100 executes, if the AP 300 as the transmission source of the radio signal is determined to be operated by the specific NW operator, the process in step S140. The UE 100 terminates the process, if the AP 300 as the transmission source of the radio signal is determined not to be operated by the specific NW operator. In other words, the UE 100 does not transmit a report on the AP 300. In other words, the UE 100 omits transmission of the report on the AP 300. Further, the UE 100 may discard information on the reception signal of the radio signal from the AP 300. The UE 100 may omit measurement on the reception signal of the radio signal from the AP 300.

In step S140, the UE 100 transmits, to the eNB 200, the report on the AP 300. The eNB 200 receives the report on the AP 300.

The UE 100 transmits, only if the AP 300 is determined to be operated by the specific NW operator, to the eNB 200, the report on the AP 300. The UE 100 transmits, to the eNB 200, the report only including the information on the AP 300 operated by the specific NW operator. Therefore, the UE 100 does not transmit, if the AP 300 is determined to be operated by another operator other than the specific NW operator, to the eNB 200, the report on the AP 300. That is, the UE 100 omits, with respect to the eNB 200, transmission of the report on the AP 300 operated by the other operator.

The UE 100 transmits, to the eNB 200, the identifier (WLAN identifier) of the AP 300, as the report on the AP 300. The identifier of the AP 300 is, for example, SSID, BSSID (Basic Service Set Identifier), HESSID (Homogenous Extended Service Set Identifier), and the like. Further, the UE 100 may transmit, to the eNB 200, information of at least any one of the reception time of the radio signal from the AP 300 and the signal intensity of the radio signal from the AP 300.

Further, the UE 100 may transmit, if the radio signal from another cell is received upon receiving the radio signal from the AP 300, identification information of the other cell (Cell ID) together with the report on the AP 300, to the eNB 200. Alternatively, the UE 100 may include the report on the AP 300 in the measurement report on the radio signal from the cell. It is noted that, the measurement report can include the identification information of the other cell.

In step S150, the eNB 200 receiving the report from the UE 100 determines whether or not the reported AP 300 is an AP which serves as a candidate of a traffic switching destination.

The eNB 200 determines whether or not the identifier of the reported AP 300 is included in the table that manages the AP which serves as a candidate of the traffic switching destination. The table includes the identifiers of the APs 300 having the coverage area that overlaps with at least a part of the coverage area configured by the cell of the eNB 200, and operated by the specific NW operator. The eNB 200 terminates the process, if the identifier of the reported AP 300 is included in the table.

On the other hand, the eNB 200 determines, if the identifier of the reported AP 300 is not included in the table, whether or not to add the identifier of the reported AP 300 to the table. The reported AP 300 is operated by the specific NW operator, and hence, the eNB 200 may add the identifier of the AP 300 to the table. Alternatively, the eNB 200 may determine, based on the information of at least any one of the reception time of the radio signal from the AP 300 included in the report and the signal intensity of the radio signal form the AP 300, whether or not to add the identifier of the AP 300. For example, the eNB 200 may add, if the reception time of the radio signal from the AP 300 exceeds the threshold value, the identifier of the AP 300 to the table. Further, the eNB 200 may add, if the signal intensity of the radio signal from the AP 300 exceeds the threshold value, the identifier of the AP 300 to the table. Alternatively, the eNB 200 may execute, (based on the information of at least any one of the reception time of the radio signal from the AP 300 included in the report and the signal intensity of the radio signal from the AP 300), the process in step S160.

It is noted that the eNB 200 may transfer, to another eNB 200, the report on the AP 300, as described later.

In step S160, the eNB 200 transmits, to the AAA server 500, the identifier (WLAN ID) of the reported AP 300. The AAA server 500 determines whether or not to authorize (permit) to add, to the table retained by the eNB 200, the received identifier of the AP 300. For example, the AAA server 500 authorizes, if the AP indicated by the identifier of the AP 300 is an AP operated by the specific NW operator, to add the identifier of the AP 300 to the table.

In step S170, the AAA server 500 transmits an authentication result to the eNB 200. The eNB 200 determines, based on the authentication result, whether or not to add the identifier of the AP 300 to the table.

It is noted that, the eNB 200 can notify, based on the table, the UE 100 of the AP 300 which serves as a candidate of the traffic switching. The UE 100 can select an appropriate AP 300 from the APs 300 which serves as a candidate of the traffic switching.

As described above, the UE 100 transmits, to the eNB 200, the report on the AP 300 operated by the specific NW operator. The eNB 200 receives the report. Consequently, the UE 100 can omit the report on the AP 300 that is not operated by the specific NW operator (that is, unavailable to the UE 100). As a result, it is possible to reduce signaling or decrease an overhead of the signaling. Further, the eNB 200 can appropriately grasp the APs 300 which serves as a candidate of the traffic switching, in comparison with the case where all the APs 300 of which radio signals are received by the UE 100 (including the APs 300 that are not associated with the specific NW operator) are reported.

Other Embodiment

Figure 6:
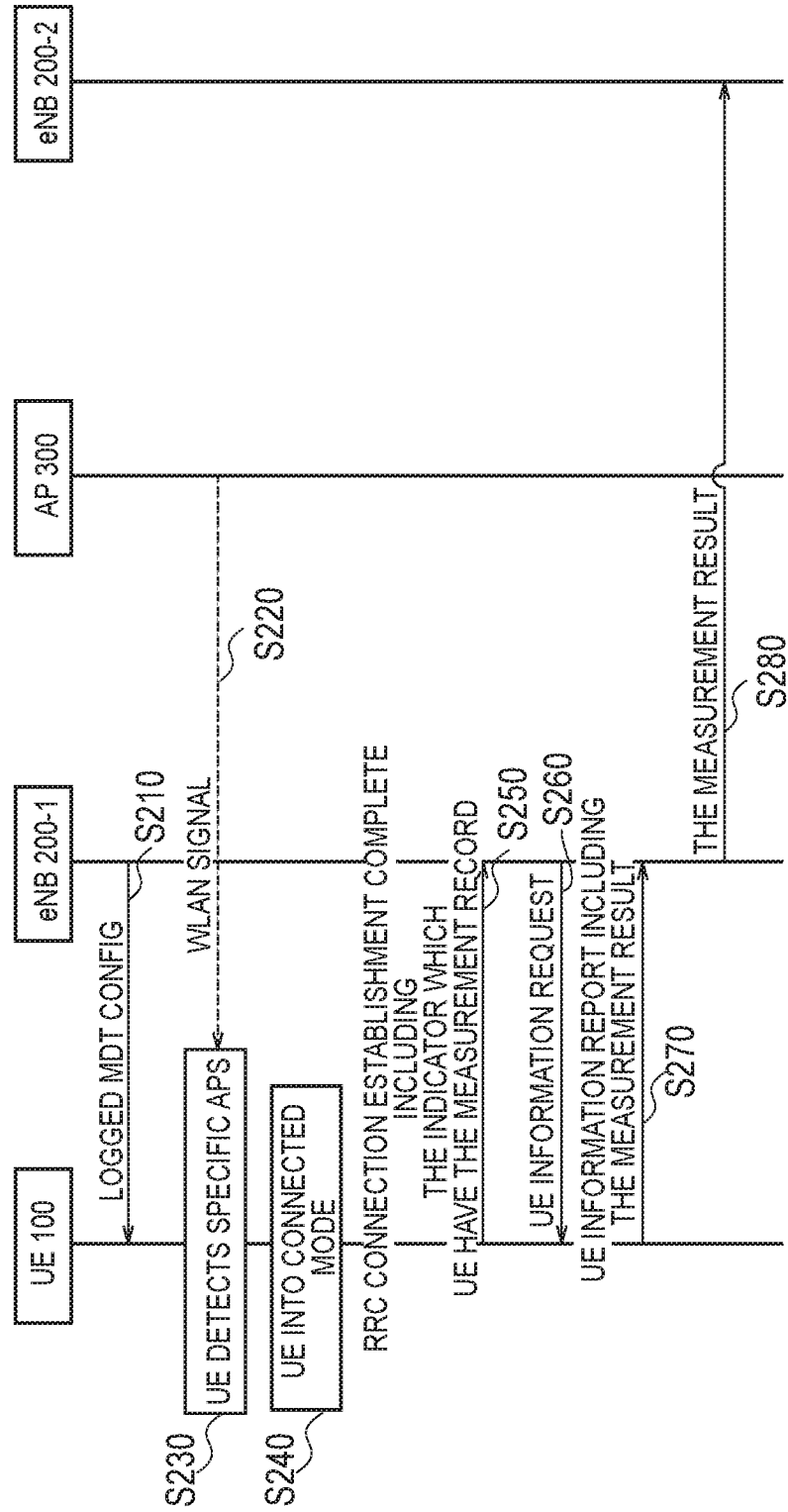
FIG. 6 is a diagram illustrating an operation according to another embodiment related to the first embodiment.

Next, a modification according to other embodiment related to the first embodiment will be described by using FIG. 6. FIG. 6 is a diagram for describing an operation according to the other embodiment. Description of parts similar to those in the embodiment will be omitted where appropriate.

As illustrated in FIG. 6, in step S210, an eNB 200-1 transmits, to the UE 100, configuration information on an MDT (Minimization of Drive Test). For example, the setting information is configuration information on a storage type MDT (Logged MDT).

It is noted that, in the Logged MDT, the UE 100 in the RRC idle state performs measurement of a radio environment according to a measurement parameter configured from a network (eNB 200-1), and stores a result of the measurement, together with location information and time information, as a measurement data. The UE 100 reports the measurement data to the network, after transitioning to the RRC connected state.

The configuration information includes control information for designating the AP 300 that is a target to be reported on the AP 300.

The UE 100 performs measurement and stores the measurement data, based on the configuration information.

Steps S220 and S230 correspond to steps S120 and S130.

In step S240, the UE 100 transitions to the RRC connected state (RRC connected mode).

In step S250, the UE 100 transmits, to the eNB 200-1, a message indicating that the connection between the eNB 200-1 and the RRC connection is completed (RRC connection establishment complete). The message includes an indicator indicating that the UE 100 has the measurement data.

In step S260, the eNB 200-1 upon receiving the message transmits, based on the indicator, an UE information request for requesting the measurement data, to the UE 100.

In step S270, the UE 100 upon receiving the UE information request transmits an UE information report to the eNB 200. The UE information report includes the measurement result.

Here, the measurement result includes a measurement result on the radio signal of the AP 300. Therefore, the UE information report includes (the contents of) the report on the AP 300 in the above-described step S140.

It is noted that, the eNB 200-1 may executes the process in the above-described step S150.

In step S280, in the eNB 200-1, the report on the AP 300 is transferred, via the X2 interface, to an eNB 200-2 operated by the specific NW operator.

The eNB 200-1 may transfer the report on the AP 300 to the eNB 200 managing the cell included in a neighboring cell list. Alternatively, the eNB 200-1 may transfer the report on the AP 300 to the eNB 200 managing the cell indicated by a cell identifier included in the UE information report. Alternatively, the eNB 200-1 may transfer the report on the AP 300 to the eNB 200 managing the cell indicated by the identifier of the cell received when the UE 100 received the radio signal from the AP 300. The eNB 200-1 can determine, based on the cell identifier and, for example, a time stamp indicating a measurement time, the eNB 200 to which the report on the AP 300 is transferred. Consequently, it is possible to omit transferring the report on the AP 300, to the eNB 200 that is not close to the AP 300, among the neighboring eNBs 200 of the eNB 200-1.

It is noted that, in an existing technique, the eNB 200-1 upon receiving the report of the Logged MDT does not transmit the report to the neighboring eNB, but only to the core network.

The eNB 200-2 upon receiving the report on the AP 300 determines, similarly to the eNB 200 in the above-described step S150, whether or not the reported AP 300 is an AP which serves as a candidate of the traffic switching destination.

As described above, the eNB 200-1 transfers the report on the AP 300 to the eNB 200-2. The eNB 200-2 receives the report on the AP 300, not only from the UE 100, but also from the eNB 200-1. Therefore, the eNB 200-2 can appropriately grasp the AP 300 which serves as a candidate of the traffic switching, in comparison with the case where the report on the AP 300 is received only from the UE 100.

Second Embodiment

Next, a second embodiment will be described. Description of parts similar to those in the first embodiment will be omitted where appropriate.

(System Configuration)

Figure 7:
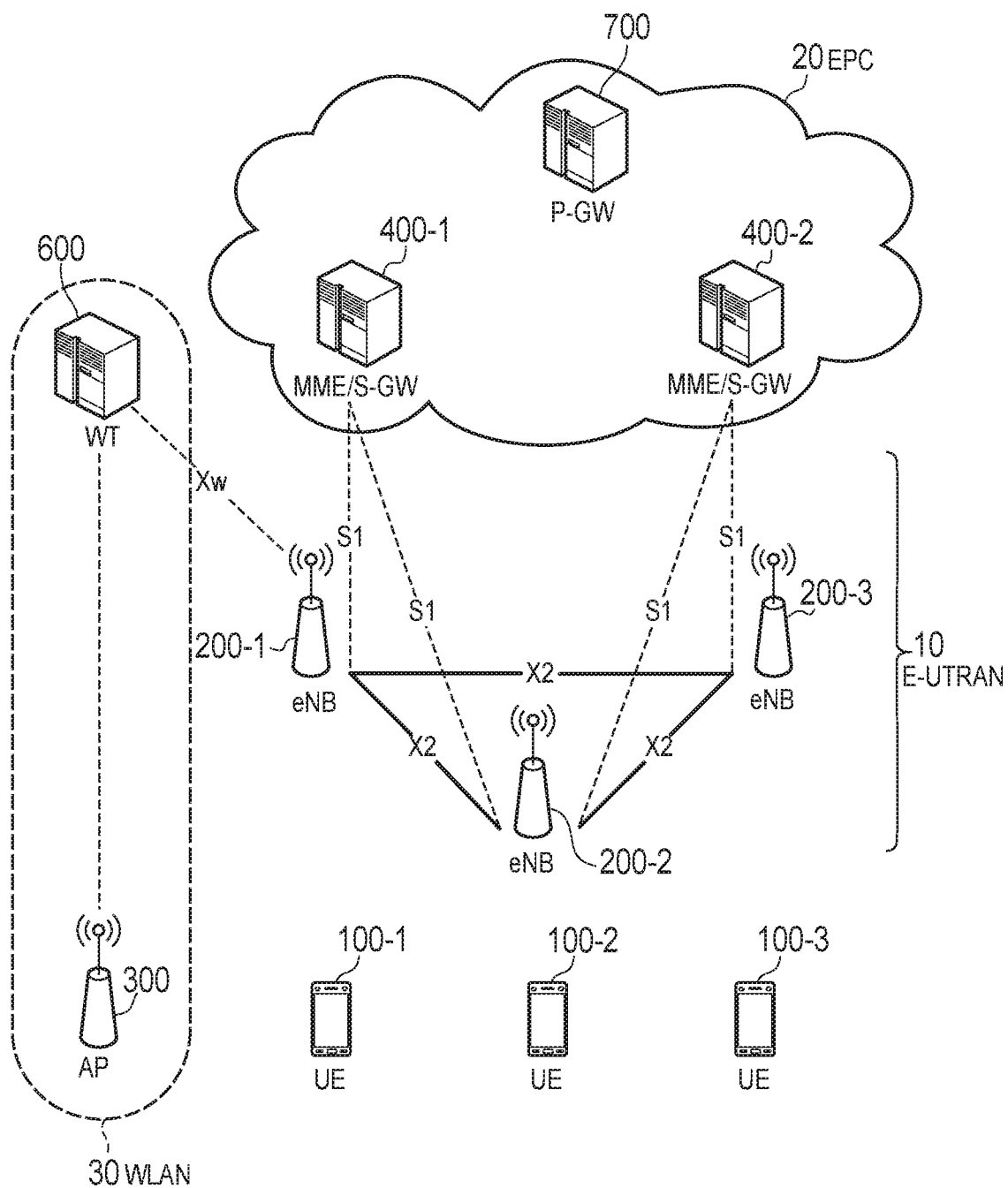
FIG. 7 is a diagram illustrating a system configuration.

FIG. 7 is a diagram illustrating a system configuration according to the second embodiment.

As illustrated in FIG. 7, the eNB 200 is connected to a WT 600, described later, via an Xw interface.

The EPC 20 may include a P-GW 700. The P-GW 700 performs control to relay user data from an external network (and to the external network).

The WLAN 30 may include a WLAN access point (hereinafter, called an "AP") 300, and a WLAN termination apparatus (hereinafter, called a "WT") 600. The WT 600 is a node in the WLAN, and is connected to the eNB 200 via the Xw interface. The WT 600 manages one or more APs 300. The WT 600 can transmit, to the eNB 200, information about the AP 300 managed by the WT 600. Further, the WT 600 can transmit, to the AP 300 managed by the WT 600, information received from the eNB 200.

Note that the Xw interface is a logical interface between a 3GPP RAN and the WLAN. The Xw interface terminates at the eNB 200 at the LTE (3GPP RAN) side, and terminates at the WT 600 at the WLAN side. In FIG. 1, the Xw interface is an interface directly connecting the eNB 200 and the WT 600, but may also be an interface passing through the MME/S-GW 400 and a P-GW 500.

Figure 8:
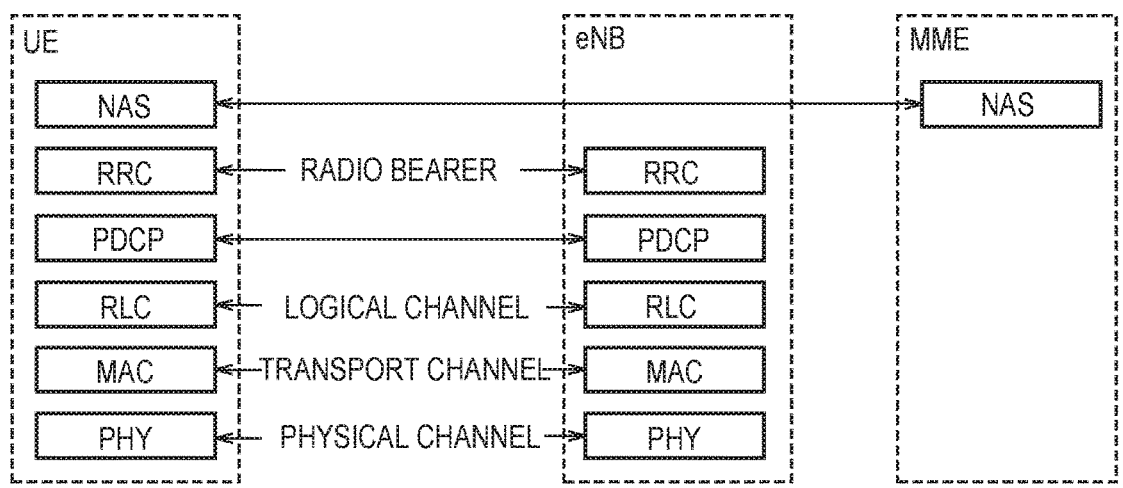
FIG. 8 is a protocol stack diagram of a radio interface in an LTE system.

FIG. 8 is a protocol stack diagram of a radio interface in the LTE system. As illustrated in FIG. 8, the radio interface protocol is classified into a first layer to a third layer of an OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, data and control signals are transmitted via a physical channel.

The MAC layer performs priority control of data, a re-transmission process by a hybrid ARQ (HARQ), a random access procedure, and the like. Between the MAC layer of the UE 100 and the MAC layer of the eNB 200, data and control signals are transmitted via a transport channel. The MAC layer of the eNB 200 includes a scheduler configured to determine a transport format (a transport block size and a modulation and coding scheme (MCS)) of an uplink and a downlink, and a resource block to be allocated to the UE 100.

The RLC layer uses functions of the MAC layer and the physical layer to transmit data to the RLC layer of a reception side. Between the RLC layer of the UE 100 and the RLC layer of the eNB 200, data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a message (RRC message) for various types of settings is transmitted. The RRC layer controls a logical channel, a transport channel, and a physical channel depending on the establishment, re-establishment, and release of a radio bearer. If a connection (RRC connection) is established between the RRC of the UE 100 and the RRC of the eNB 200, the UE 100 is in an RRC connected state (connected state), and if the connection is not established, the UE 100 is in an RRC idle state (idle state).

An NAS (Non-Access Stratum) layer positioned above the RRC layer performs session management, mobility management and the like.

(Radio Terminal)

Figure 9:
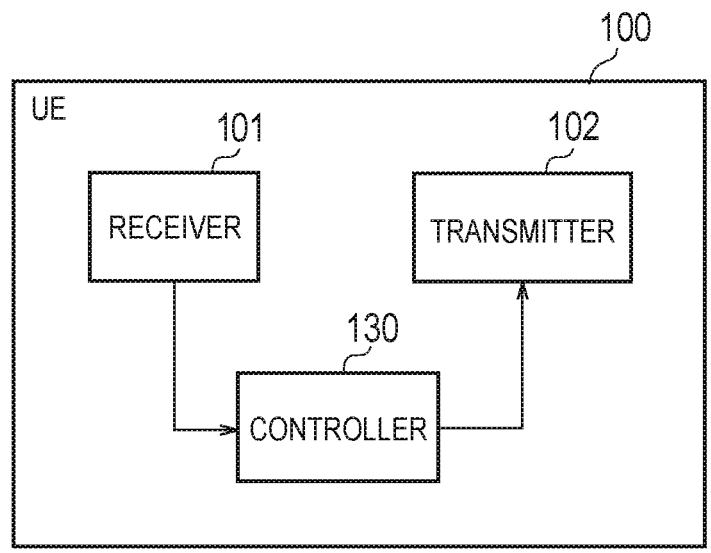
FIG. 9 is a block diagram illustrating the UE 100.

A configuration of the UE 100 (radio terminal) will be described, below. FIG. 9 is a block diagram illustrating the UE 100.

As illustrated in FIG. 9, the UE 100 includes a receiver 101, a transmitter 102, and a controller 130. The receiver 101 and the transmitter 102 may be unified as one in the form of a transceiver. Further, the UE 100 may include a receiver 101 and a transmitter 102 used in common in cellular communication and WLAN communication. The UE 100 may include a receiver 101 and a transmitter 102 for cellular communication, and a receiver 101 and a transmitter 102 for WLAN communication, respectively. In this case, the receiver 101 and the transmitter 102 for cellular communication may configure the LTE radio communication unit 110 of the first embodiment. The receiver 101 and the transmitter 102 for WLAN communication may configure the WLAN radio communication unit 120 of the first embodiment. Note that the controller 130 may correspond to the controller 130 of the first embodiment.

The receiver 101 performs various types of receptions under the control of the controller 130. The receiver 101 includes an antenna. The receiver 101 converts a radio signal received by the antenna into a baseband signal (received signal), and outputs the baseband signal to the controller 130.

The transmitter 102 performs various types of transmissions under the control of the controller 130. The transmitter 102 includes an antenna. The transmitter 102 converts a baseband signal (transmission signal) output from the controller 130 into a radio signal, and transmits the radio signal from the antenna.

The controller 130 performs various types of controls in the UE 100. The controller 130 can control the receiver 101 and the transceiver 102. The controller 130 includes a processor and a memory. The memory stores a program to be executed by the processor, and information to be used for a process by the processor. The processor includes a baseband processor configured to perform modulation and demodulation, encoding and decoding and the like of a baseband signal, and a CPU (Central Processing Unit) configured to perform various processes by executing the program stored in the memory. The controller 130 executes various types of processes described later, and various types of communication protocols described above.

(Base Station)

Figure 10:
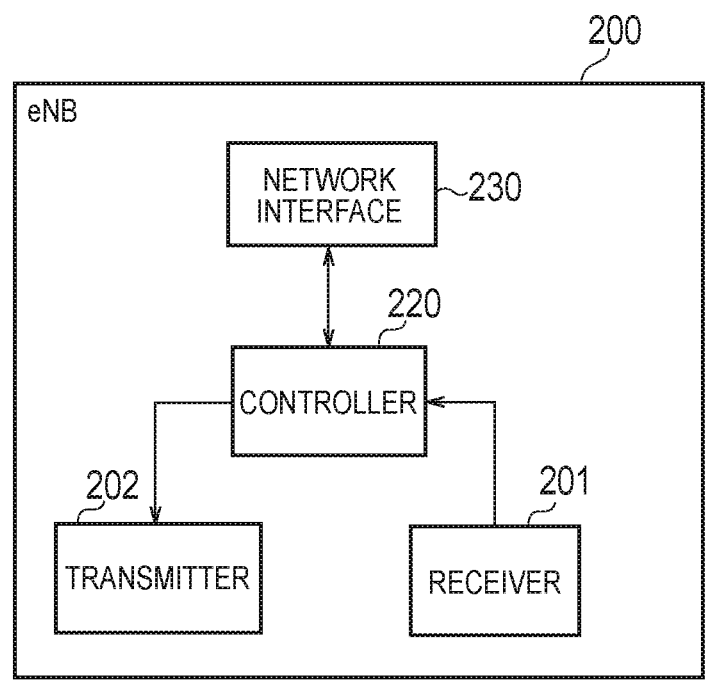
FIG. 10 is a block diagram illustrating the eNB 200.

A configuration of the eNB 200 (base station) will be described, below. FIG. 10 is a block diagram illustrating the eNB 200.

As illustrated in FIG. 10, the eNB 200 includes a receiver 201, a transmitter 202, a controller 220, and a network interface 230. The receiver 201 and the transmitter 202 may be unified as one in the form of a transceiver. The transceiver may correspond to the LTE radio communication unit 210 of the first embodiment. Note that the controller 220 may correspond to the controller 220 of the first embodiment.

The receiver 201 performs various types of receptions under the control of the controller 220. The receiver 210 includes an antenna. The receiver 201 converts a radio signal received by the antenna into a baseband signal (received signal), and outputs the baseband signal to the controller 220.

The transmitter 202 performs various types of transmissions under the control of the controller 220. The transmitter 202 includes an antenna. The transmitter 202 converts a baseband signal (transmission signal) output from the controller 220 into a radio signal, and transmits the radio signal from the antenna.

The controller 220 performs various types of controls in the eNB 200. The controller 220 can control the receiver 201, the transmitter 202, and the network interface 230. The controller 220 includes a processor and a memory. The memory stores a program to be executed by the processor, and information to be used for a process by the processor. The processor includes a baseband processor configured to perform modulation and demodulation, encoding and decoding and the like of a baseband signal, and a CPU (Central Processing Unit) configured to perform various processes by executing the program stored in the memory. The controller 220 executes various types of processes described later, and various types of communication protocols described above.

The network interface 230 is connected to a neighbour eNB 200 via the X2 interface, and is connected to the MME/S-GW 400 via the S1 interface. The network interface 230 is used for communication performed over the X2 interface, communication performed over the S1 interface, and the like.

Further, the network interface 230 is connected to the WT 600 via the Xw interface. The network interface 230 is used for communication performed over the Xw interface, and the like.

(Wireless LAN Access Point)

Figure 11:
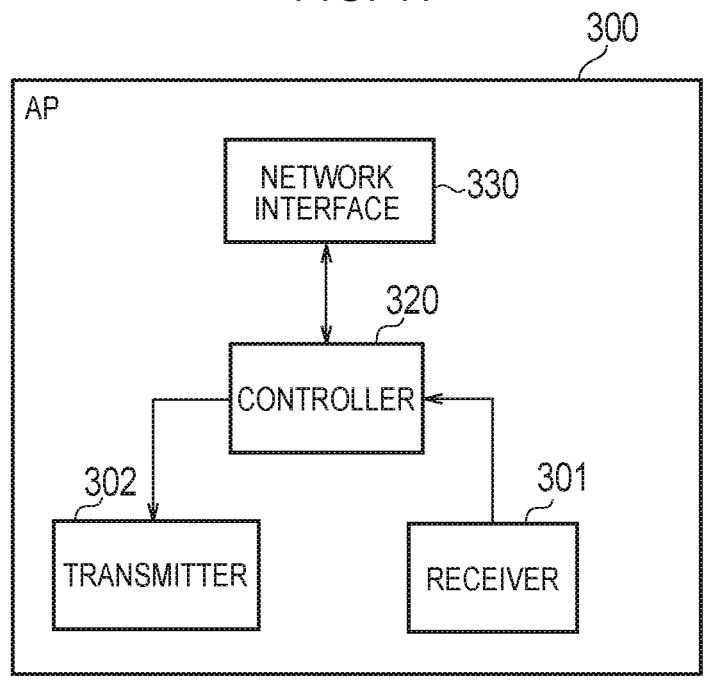
FIG. 11 is a block diagram illustrating the AP 300.

A configuration of the AP 300 (wireless LAN access point) will be described, below. FIG. 11 is a block diagram illustrating the AP 300.

As illustrated in FIG. 11, the AP 300 includes a receiver 301, a transmitter 302, a controller 320, and a network interface 330. The receiver 301 and the transmitter 303 may be unified as one in the form of a transceiver. The transceiver may correspond to the WLAN radio communication unit 310 of the first embodiment. Note that the controller 320 may correspond to the controller 320 of the first embodiment.

The receiver 301 performs various types of receptions under the control of the controller 320. The receiver 301 includes an antenna. The receiver 301 converts a radio signal received by the antenna into a baseband signal (received signal), and outputs the baseband signal to the controller 320.

The transmitter 302 performs various types of transmissions under the control of the controller 320. The transmitter 302 includes an antenna. The transmitter 302 converts a baseband signal (transmission signal) output from the controller 320 into a radio signal, and transmits the radio signal from the antenna.

The controller 320 performs various types of controls in the AP 300. The controller 320 can control the receiver 301, the transmitter 302, and the network interface 330. The controller 320 includes a processor and a memory. The memory stores a program to be executed by the processor, and information to be used for a process by the processor. The processor includes a baseband processor configured to perform modulation and demodulation, encoding and decoding and the like of a baseband signal, and a CPU (Central Processing Unit) configured to perform various processes by executing the program stored in the memory. The controller 320 executes various types of processes described later, and various types of communication protocols described above.

The network interface 330 is connected to a backhaul via a predetermined interface. Further, the network interface 330 is connected to the WT 600. The network interface 330 is used for communication with the WT 600, and the like.

(Wireless LAN Termination Apparatus)

Figure 12:
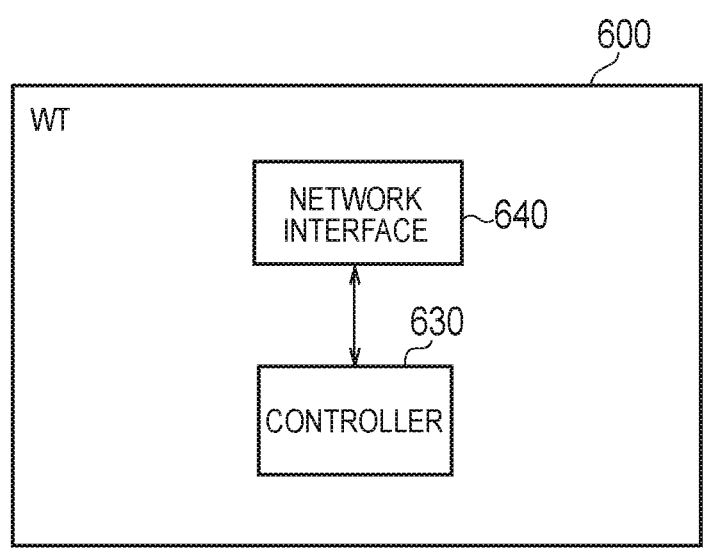
FIG. 12 is a block diagram illustrating a WT 600.

A configuration of the WT 600 (wireless LAN termination apparatus) will be described, below. FIG. 12 is a block diagram illustrating the WT 600.

As illustrated in FIG. 12, the WT 600 includes a controller 630 and a network interface 640.

The controller 630 performs various types of controls in the WT 600. The controller 630 can control the network interface 640. The controller 630 includes a processor and a memory. The memory stores a program to be executed by the processor, and information to be used for a process by the processor. The processor includes a baseband processor configured to perform modulation and demodulation, encoding and decoding and the like of a baseband signal, and a CPU (Central Processing Unit) configured to perform various processes by executing the program stored in the memory. The controller 630 executes various types of processes described later, and various types of communication protocols described above.

The network interface 640 is connected to a backhaul via a predetermined interface. Further, the network interface

640 is connected to the AP 300. The network interface 640 is used for communication with the AP 300, and the like.

Further, the network interface 640 is connected to the eNB 200 via the Xw interface. The network interface 640 is used for communication performed over the Xw interface, and the like.

(Operation Environment)

Figure 13:
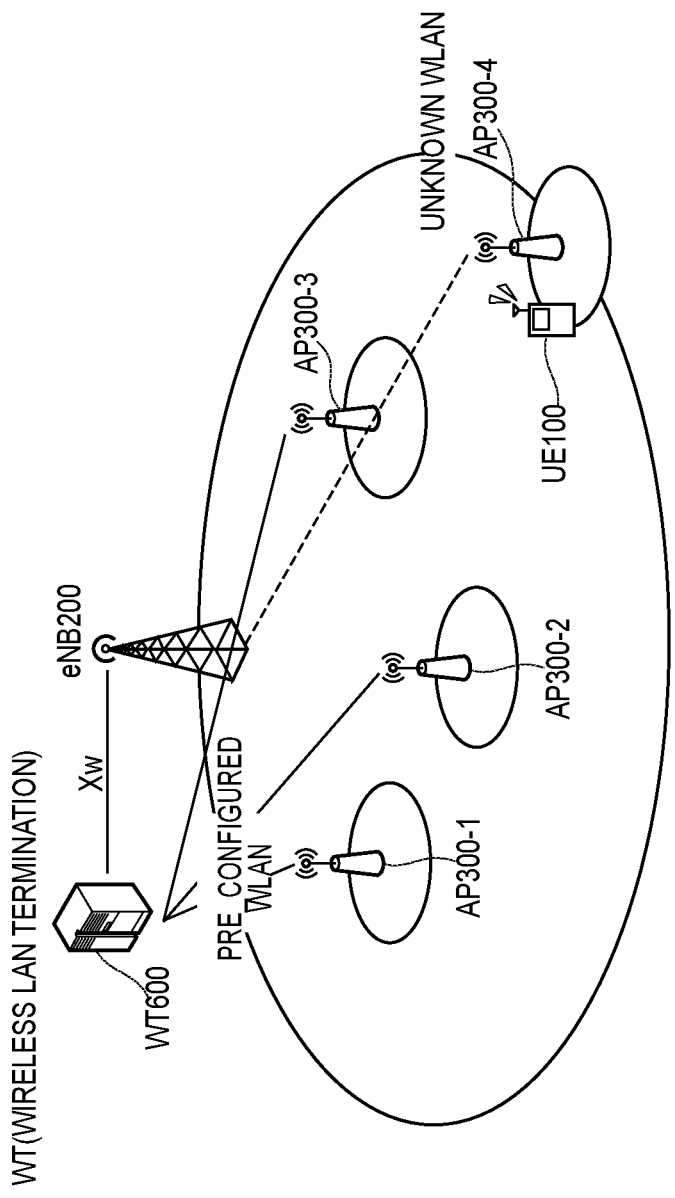
FIG. 13 is a diagram illustrating an operation environment.

An operation environment will be described by using FIG. 13, below. FIG. 13 is a diagram illustrating the operation environment.

In FIG. 13, the UE 100 is located in a cell managed by the eNB 200. The UE 100 establishes an RRC connection with the eNB 200, and is in an RRC connected state. Alternatively, the UE 100 is in an RRC idle state, and may transition to the RRC connected state when transmitting predetermined information to the eNB 200.

A plurality of APs 300 (AP 300-1 through AP 300-4) are located in the periphery of the eNB 200. The APs 300 may be located in the cell managed by the eNB 200. Further, each AP 300 has a coverage area. Each AP 300 provides the UE 100 located in the coverage area with a wireless LAN service. The coverage area of each AP 300 overlaps with at least a part of a coverage area configured by the cell (the coverage area held by the eNB 200). Generally, the coverage area of each AP 300 is smaller than the coverage area of the cell.

The Xw interface may be set between the eNB 200 and the WT 600, and the eNB 200 may be able to communicate with the WT 600 via the Xw interface. Alternatively, the Xw interface may not be set between the eNB 200 and the WT 600.

The eNB 200 knows that the AP 300-1 through the AP 300-3 are present as the APs 300 having a coverage area overlapping with the coverage area configured by the cell of the eNB 200. On the other hand, the eNB 200 does not know the AP 300-4.

In such a situation, it is assumed that the UE 100 receives a beacon signal from the AP 300-4, and reports the AP 300-4 to the eNB 200. In this case, since the eNB 200 does not know the AP 300-4, the eNB 200 does not know a WT that manages the AP 300-4. Therefore, the eNB 200 may not be able to set the Xw interface with an appropriate WT.

Thus, a method by which the eNB 200 can appropriately grasp the AP 300 and the WT 600 will be described, below.

Note that the below-described process (operation) executed by the UE 100 is executed by at least any one of the receiver 110, the transmitter 120, and the controller 130 included in the UE 100, but is described as a process executed by the UE 100 for the purpose of convenience. Similarly, the below-described process (operation) executed by the eNB 200 is executed by at least any one of the receiver 210, the transmitter 220, the controller 230, and the network interface 240 included in the eNB 200, but is described as a process executed by the eNB 200 for the purpose of convenience. Similarly, the below-described process (operation) executed by the AP 300 is executed by at least any one of the receiver 310, the transmitter 320, the controller 330, and the network interface 340 included in the AP 300, but is described as a process executed by the AP 300 for the purpose of convenience. Similarly, the below-described process (operation) executed by the WT 600 is executed by at least any one of the controller 630 and the network interface 640 included in the WT 600, but is described as a process executed by the WT 600 for the purpose of convenience.

A second embodiment will be described. In the second embodiment, a case in which the eNB 200 transmits an inquiry about the WT 600 will be described.

(Operation According to Second Embodiment)

Figure 14:
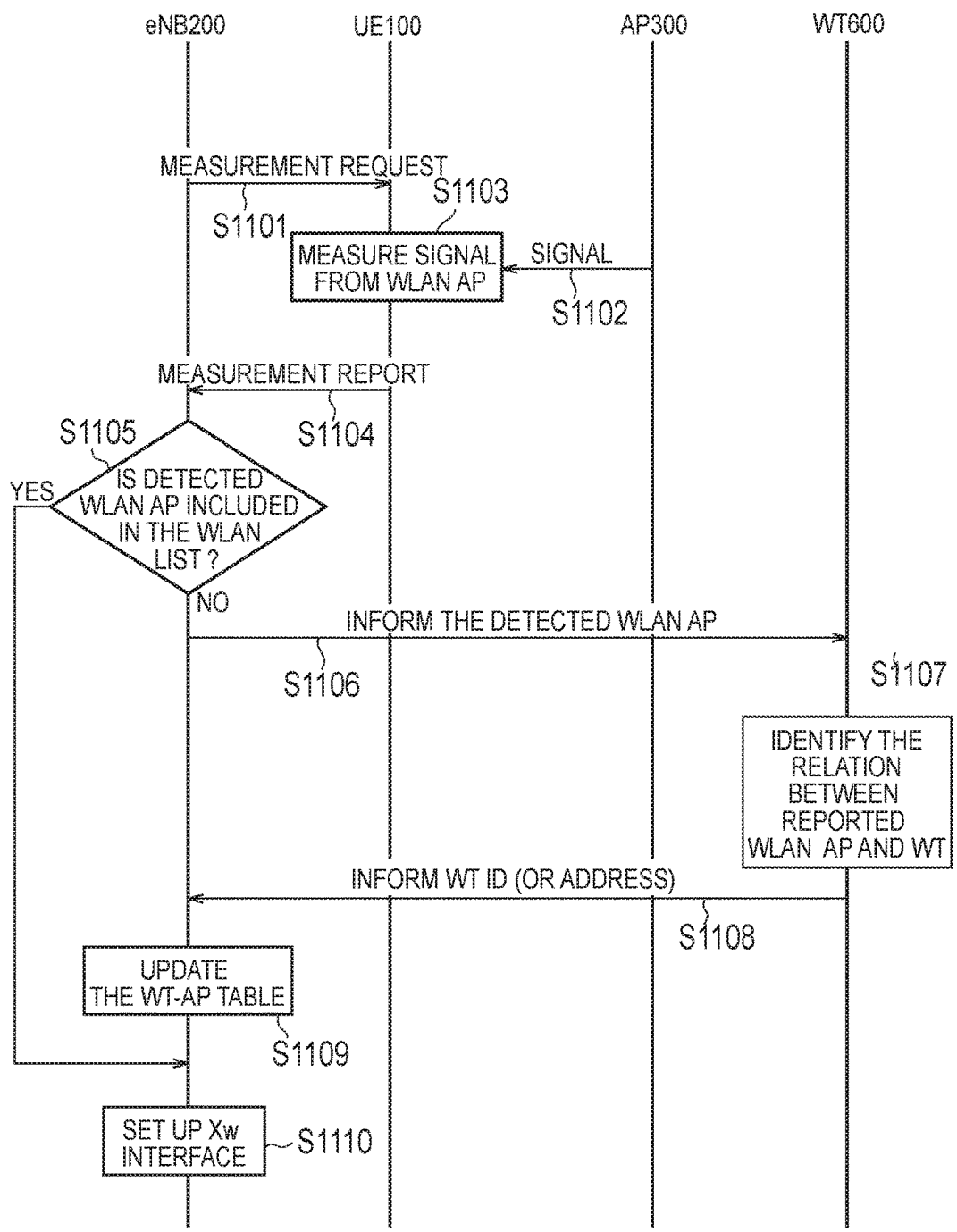
FIG. 14 is a sequence diagram for describing an operation according to a second embodiment.

An operation according to the second embodiment will be described by using FIG. 14. FIG. 14 is a sequence diagram for describing the operation according to the first embodiment.

As illustrated in FIG. 14, in step S1101, the eNB 200 requests for a report on the AP 300, to the UE 100. Specifically, the eNB 200 transmits control information (Measurement request) for designating the AP 300 that is the target of the report on the AP 300. The UE 100 receives the control information. The number of APs 300 that are the targets to be reported can be limited by the control information.

The eNB 200 can transmit the control information by unicast. For example, the eNB 200 includes the control information into a message (MeasConfig) for configuring a measurement report (Measurement Report) on a radio signal from a cell, and transmits the message to the UE 100. The eNB 200 may include the control information into "MeasObjectToAddModList" in "MeasConfig". Alternatively, the eNB 200 may transmit the control information by broadcast. The eNB 200 may transmit, for example, the control information to the UE 100 in the cell of the eNB 200, by SIB (system information block).

The control information can include, for example, identification information (a PLMN ID, an ECGI (E-UTRAN Cell Global ID), and the like) enabling to designate a PLMN to which the eNB 200 (a serving cell) belongs. The control information may include identification information indicating a predetermined network operator. For example, the identification information indicating the predetermined network operator is an MNC (Mobile Network Code) indicating a carrier code, other identification information (ENUMRATED) assigned to each network operator, and the like. Alternatively, the control information may include an identifier of the AP 300 associated with the predetermined network operator. For example, the identifier of the AP 300 associated with the predetermined network operator is an SSID (Service Set Identifier) at least a part of which is configured by a bit string commonly set to the AP 300 operated by the predetermined network operator.

Further, the control information may include at least any one of a threshold value of a reception time of the radio signal from the AP 300 (hereinafter, a first threshold value) and a threshold value of the signal intensity of the radio signal (RSSI) from the AP 300 (hereinafter, a second threshold value). The UE 100 can consider, if the reception time of the radio signal from the AP 300 exceeds the first threshold value, the AP 300 as a target of a report described later. The first threshold value may be a timer. The UE 100 can start, if the radio signal from the AP 300 is received, the timer, and consider, if the radio signal from the AP 300 has been received until the timer expires, the AP 300 as a target to be reported. The timer may be a timer different from TTT (Time To Trigger). Further, the UE 100 considers, if the signal intensity of the radio signal from the AP 300 exceeds the second threshold value, the AP 300 as a target to be reported. Further, the UE 100 may start, if the reception time of the radio signal from the AP 300 exceeds the first threshold value, measurement on the radio signal (measurement of the RSSI, and the like).

Further, the control information may include information for designating an AP from which a radio signal including the identification information related to the AP 300 is not transmitted (the so-called stealth AP). The stealth AP may be an AP 300 not having an SSID of the AP 300, or may be an AP 300 in which "0" or "00x0" is set as the SSID. Alternatively, the stealth AP may be an AP 300 in which a stealth function is enabled. In this case, the AP 300 does not transmit a beacon signal including the SSID (or the ESSID) during the time the stealth function is enabled. That is, the stealth AP omits the transmission of the beacon signal including the SSID (or the ESSID). On the other hand, the AP 300 can transmit the beacon signal including the SSID (or the ESSID) during the time the stealth function is disabled.

The stealth AP can transmit, upon receiving a probe request from the UE 100, a probe response. The probe response may include the identification information (for example, the SSID, the ESSID, etc.) related to the AP 300.

Note that since the eNB 200 can make configuration related to the stealth AP in the UE 100, the operator can, for example, acquire coverage information of the AP in the preparation stage (for example, during the arrangement test), from the UE 100.

The eNB 200 can configure in the UE 100, through the request for a report on the AP 300 (that is, the transmission of the control information), the AP 300 to be reported.

In step S1102, the AP 300 transmits a radio signal (beacon signal). The radio signal includes the identifier of the AP 300 (the WLAN identifier). The identifier of the AP 300 is, for example, an SSID, a BSSID (Basic Service Set Identifier), an HESSID (Homogenous Extended Service Set Identifier), and the like. Further, the beacon signal may include an identifier of the network to which the AP 300 belongs. The identifier of the network is, for example, an ESSID (Extended Service Set Identifier).

The AP 300 transmits the radio signal including the identifier of the AP 300 associated with a predetermined network operator. Alternatively, the AP 300 may transmit, as a radio signal, a beacon signal including identification information enabling to designate a network operator operating the AP 300, to a field arbitrarily configurable by the network operator. The identification information is, for example, identification information of the PLMN to which the AP 300 belongs, identification information indicating the network operator operating the AP 300, and the like. These pieces of identification information are information similar to the information included in the above-described control information.

In step S1103, the UE 100 can start, based on the configuration (control information), monitoring (reception) of the radio signal from the AP 300. As a result, the UE 100 receives the radio signal from the AP 300. The UE 100 may perform, based on the configuration, measurement on the radio signal from the AP 300. The UE 100 may or may not perform measurement on the radio signal from an AP 300 not to be reported.

If a stealth AP is configured as the AP 300 to be reported, the UE 100 may transmit, based on the configuration, a request (probe request) for identification information related to the stealth AP. The radio signal in step S1102 may be a probe response from the AP 300 that is the stealth AP.

In step S1104, the UE 100 transmits a report (Measurement report) on the AP 300, to the eNB 200. The report on the AP 300 includes the identification information of the AP 300. As a result, the UE 100 can report the identification information of the AP 300 to the eNB 200. The UE 100 may report, to the eNB 200, not only the identifier of the AP 300, but also the identifier (for example, the ESSID) of the network to which the AP 300 belongs. The UE 100 may include at least any one piece of information about the reception time of the radio signal from the AP 300 and the signal intensity of the radio signal from the AP 300, into the report on the AP 300.

The UE 100 may report, based on the configuration, the identification information of only the AP 300 to be reported, to the eNB 200. Alternatively, if receiving a radio signal not only from the AP 300 to be reported but also from another AP 300 (that is, the AP 300 not to be reported), the UE 100 may report, to the eNB 200, not only the identification information of the AP 300 to be reported but also the identification information of the other AP 300.

Alternatively, if determining that the other AP 300 is operated by a network operator operating the eNB 200 (hereinafter, called the specific NW operator), the UE 100 may report the identification information of the other AP 300 to the eNB 200. That is, the UE 100 may not need to report, to the eNB 200, identification information of another AP 300 that is not operated by the specific NW operator (is operated by another NW operator). The UE 100 can make a determination by using at least any one of the following methods, for example.

In a first method, the UE 100 determines, if the PLMN indicated by the identification information of the PLMN to which the AP 300 belongs is identical to the PLMN to which the eNB 200 (serving cell) belongs, that the AP 300 is operated by the specific NW operator.

In a second method, the UE 100 determines, if the network operator indicated by the identification information indicating the network operator operating the AP 300 is the specific NW operator, that the AP 300 is operated by the specific NW operator. That is, the UE 100 determines, if the identification information indicating the specific NW operator is included in the radio signal from the AP 300, that the AP 300 is operated by the specific NW operator.

In a third method, the UE 100 determines, if the identifier of the AP 300 is associated with the specific NW operator, that the AP 300 is operated by the specific NW operator. That is, the UE 100 determines, if the identifier of the AP 300 associated with the specific NW operator is included in the radio signal from the AP 300, that the AP 300 is operated by the specific NW operator.

Note that, the UE 100 may start the determination if the reception time of the radio signal from the AP 300 exceeds the first threshold value. Alternatively, the UE 100 may start the determination if the signal intensity of the radio signal from the AP 300 exceeds the second threshold value. Considering the measurement load of the reception time and the signal intensity, the UE 100 preferably starts measurement on the radio signal (measurement of the reception time, the RSSI, and the like) or compares measurement result (measurement result of the reception time, the RSSI, and the like) with the threshold value (the first threshold value, the second threshold value), after the determination ends.

The UE 100 may discard, if another AP 300 is not operated by the specific NW operator, information on the received signal of the radio signal from the other AP 300. The UE 100 may omit measurement on the received signal of the radio signal from the other AP 300.

In step S1105, the eNB 200 that receives the report from the UE 100 determines whether or not the reported AP 300 (that is, the AP 300 detected by the UE 100) is included in a WLAN list.

The WLAN list is a list of the identification information of the AP 300 grasped by the eNB 200. The WLAN list may be a list of the identification information of an AP that is a candidate of the traffic switching destination. That is, the WLAN list is the identification information of the AP 300 having the coverage area that overlaps with at least a part of the coverage area configured by the cell of the eNB 200, and includes the identification information of the AP 300 operated by the specific NW operator.

If the reported AP 300 is not included in the WLAN list, the eNB 200 executes a process of step S1106. If the reported AP 300 is included in the WLAN list, the eNB 200 executes a process of step S1110 or terminates the process.

In step S1106, the eNB 200 transmits, based on the identification information of the AP 300, an inquiry about the WT to the WT 600. That is, the eNB 200 informs the WT 600 of the detected AP 300. The identification information of the AP 300 is included in the inquiry message.

The eNB 200 can transmit the inquiry to the WT 600 by a method described later. If holding a WT-AP table (see Table 1), the eNB 200 may determine an inquiry destination, based on the WT-AP table.

TABLE 1

| | |
|---|---|
| WT600-1 | AP300-1 (BSSID: #1) |
| | AP300-2 (BSSID: #2) |
| | AP300-3 (BSSID: #3) |
| WT600-2 | AP300-3 (BSSID: #3) |

The WT-AP table is a table in which the WT 600 and the AP 300 managed by the WT 600 are associated. In the WT-AP table, the identification information of the WT 600 and the identification information of the AP 300 are associated. The AP 300 in the WT-AP table is same as the AP 300 in the WLAN list. Therefore, the WT 600 in the WT-AP table manages the AP 300 having the coverage area that overlaps with at least a part of the coverage area configured by the cell of the eNB 200.

Note that the eNB 200 may add the identification information of the WT 600 to the WLAN list, and hold the WLAN list as the WT-AP table.

The eNB 200 can transmit the inquiry to the WT 600 in the WT-AP table. As a result, transmitting an inquiry to the WT 600 managing the AP having a coverage area that does not overlap with the coverage area held by the eNB 200 can be reduced.

The eNB 200 may transmit an inquiry to all WTs 600 in the WT-AP table, or may transmit an inquiry to some of the WTs 600 in the WT-AP table. For example, the eNB 200 may transmit, if the identifier of the network to which the AP 300 belongs is reported, an inquiry to the WT 600 managing another AP 300 associated with the identifier of the network. Since the probability of each AP 300 having the same identifier of the network being located at a close distance is high, the probability of the APs 300 being managed by the same WT 600 is high. Therefore, the eNB 200 can reduce signaling, by transmitting an inquiry to the WT 600 managing the other AP 300 having the same identifier of the network.

In step S1107, it is determined whether or not the WT 600 that receives the inquiry about the WT manages the AP 300 indicated by the identification information of the AP 300 included in the inquiry message.

If not managing the AP 300, the WT 600 may transmit the identification information of the AP 300 to another WT 600 (for example, an adjacent WT) to inquire whether or not the other WT 600 manages the AP 300.

In step S1108, the WT 600 transmits, to the eNB 200, a response to the inquiry from the eNB 200. For example, the WT 600 may transmit, to the eNB 200, information indicating whether the AP 300 is managed or not (for example, ACK/NACK). Alternatively, the WT 600 may transmit, to the eNB 200, the identifier of the WT 600 managing the AP 300 (the identifier of the WT 600/the identifier of the other WT 600). The WT 600 may transmit to the eNB 200 information indicating not knowing the WT 600 managing the AP 300.

Further, if the identifier of the network to which the AP 300 belongs is included in the inquiry from the eNB 200, the WT 600 may also transmit, to the eNB 200, the identification information of the AP 300 having an identifier of the network identical to the identifier of the network to which the AP 300 belongs. As a result, the eNB 200 can inform the UE 100 of the identification information of the AP that is a candidate of the traffic switching destination, by taking into consideration a wireless LAN roaming.

Note that the WT 600 may transmit an address of the WT 600 instead of the identifier of the WT 600 (or, together with the identifier of the WT 600).

In step S1109, the eNB 200 that receives the response associates, if finding out the WT 600 managing the AP 300, the WT 600 and the AP 300, and stores the association. Specifically, the eNB 200 updates the WT-AP table. The eNB 200 may transmit, if not finding out the WT 600 managing the AP 300, an inquiry to another WT 600 to which an inquiry has not been transmitted (execute step S1106). Alternatively, the eNB 200 may make an inquiry to another node by a method described later.

Further, the eNB 200 can add the identification information of the AP 300 to the WLAN list.

In step S1110, if the eNB 200 receives an identifier of a new WT 600, the eNB 200 may start an operation for setting the Xw interface. Alternatively, the eNB 200 may start, if the Xw interface is not set between the eNB 200 and the WT 600 managing the AP 300, an operation for setting the Xw interface. The eNB 200 transmits a message for setting the Xw interface to the WT 600 to start the setting of the Xw interface.

Note that the eNB 200 may not need to start the operation for setting the Xw interface, even if the Xw interface is not set between the eNB 200 and the WT 600. That is, the eNB 200 can omit the process of step S1110.

The eNB 200 can exchange, if the Xw interface is set between the eNB 200 and the WT 600, information on a cellular/WLAN radio interworking technology with the WT 600 via the Xw interface. The eNB 200 can appropriately control traffic switching, based on the exchanged information.

Note that the eNB 200 may transmit, to the UE 100 that has reported the AP 300, an indicator for offloading to the AP 300 (for example, the stealth AP).

As described above, the eNB 200 can appropriately grasp the WT 600 managing the AP 300 reported from the UE 100.

(Determination of Destination to which Inquiry is Transmitted)

Figure 15:
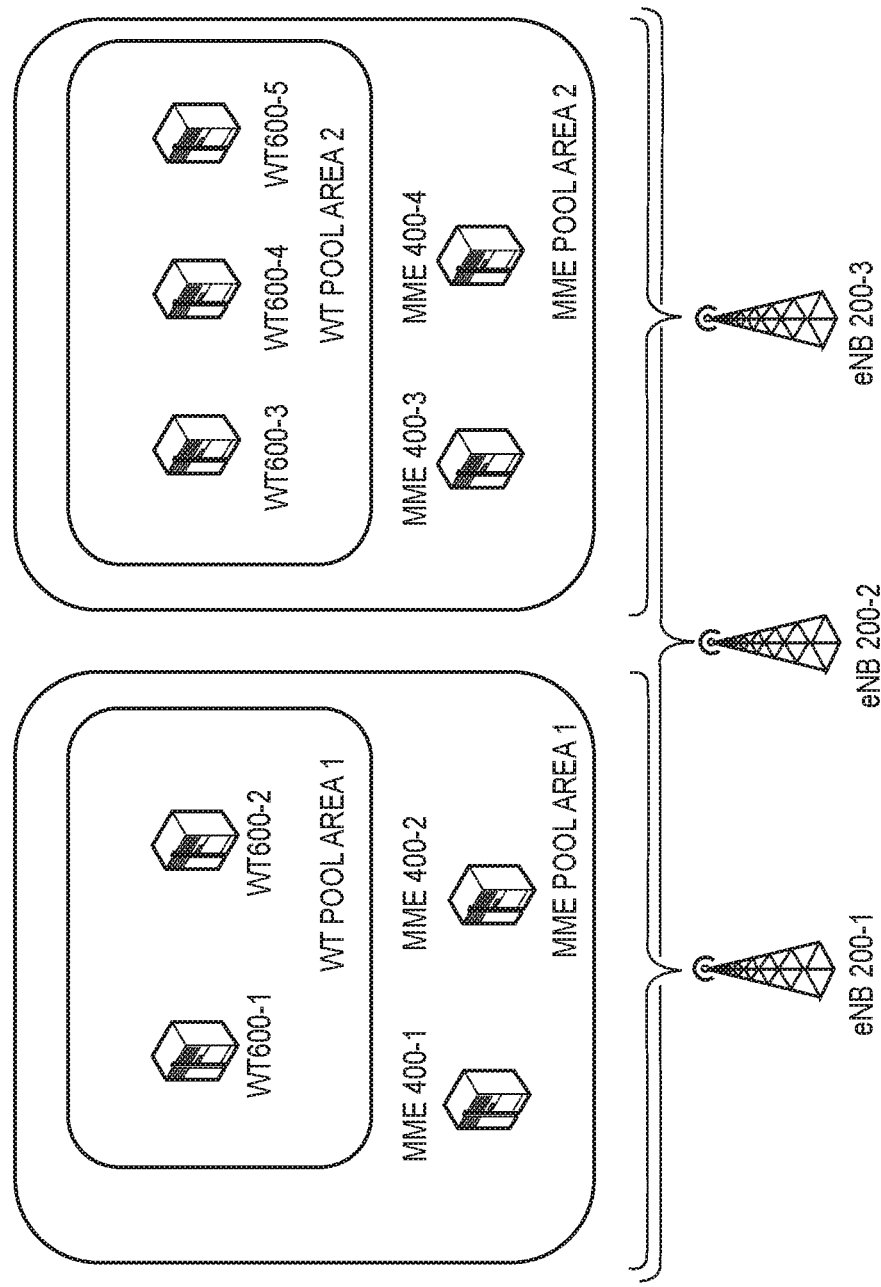
FIG. 15 is a diagram illustrating an example of a method of determining a destination to which an inquiry is transmitted.

An example of a method of determining a destination to which an inquiry about the WT is transmitted will be described by using FIG. 15. FIG. 15 is a diagram illustrating an example of the method of determining a destination to which an inquiry is transmitted. The eNB 200 may determine, by using the method described below, a destination to which an inquiry about the WT is transmitted.

As illustrated in FIG. 15, an MME pool area 1 includes an MME 400-1 and an MME 400-2. An MME pool area 2 includes an MME 400-3 and an MME 400-4.

Further, a WT pool area 1 includes a WT 600-1 and a WT 600-2. A WT pool area 2 includes a WT 600-3, a WT 600-4, and a WT 600-5. The MME pool area 1 is associated with the WT pool area 1. The MME pool area 2 is associated with the WT pool area 2. The eNB 200-1 is associated with the MME pool area 1, the eNB 200-2 is associated with the MME pool area 1 and the MME pool area 2, and an eNB 200-3 is associated with the MME pool area 2. Note that these associations are performed by the operator.

First of all, the UE 100 transmits, to the eNB 200-1, a report on the AP 300 including a MME code. The UE 100 acquires the MME code through a NAS message. The UE 100 may transmit beforehand the MME code to the eNB 200-1, before transmitting the report on the AP 300 to the eNB 200-1. For example, the UE 100 may transmit the MME code to the eNB 200-1 when updating a tracking area.

It is assumed that the eNB 200-1 designates the MME 400-2, based on the MME code included in the report. The eNB 200-1 transmits an inquiry about the WT to the MME 400-2.

The MME 400-2 selects, based on information included in the inquiry about the WT, a WT from the MME pool area 1. The MME 400-2 selects a WT, for example, based on network topology. Specifically, the MME 400-2 selects, based on the location of the UE 100, a WT (for example, the WT 600-2) that satisfies a predetermined condition (such as a WT managing an AP 300 that can serve the UE 100, or a WT having a service area in which the reduced possibility of a change in the WT) from the WT pool area 1. The MME 400-2 transfers the inquiry about the WT to the WT 600-2. The WT 600-2 may transmit a response to the inquiry about the WT to the eNB 200-1 via the MME 400-2, or may transmit the response to the eNB 200-1 without passing through the MME 400-2 if the Xw interface is set.

Alternatively, the MME 400-2 may transmit the inquiry about the WT to all WTs 600 in the WT pool area 1. The MME 400-2 may designate, by receiving a response from the WT 600 about whether or not the AP 300 is managed, the WT 600 managing the AP 300.

In this way, the eNB 200-1 can transmit the inquiry about the WT to the WT 600, and receive a response to the inquiry from the WT 600. Note that the eNB 200-2 and the eNB 200-3 can also, in the same manner as the eNB 200-1, transmit the inquiry about the WT to the WT 600.

(Operation According to Another Embodiment Related to Second Embodiment)

Figure 16:
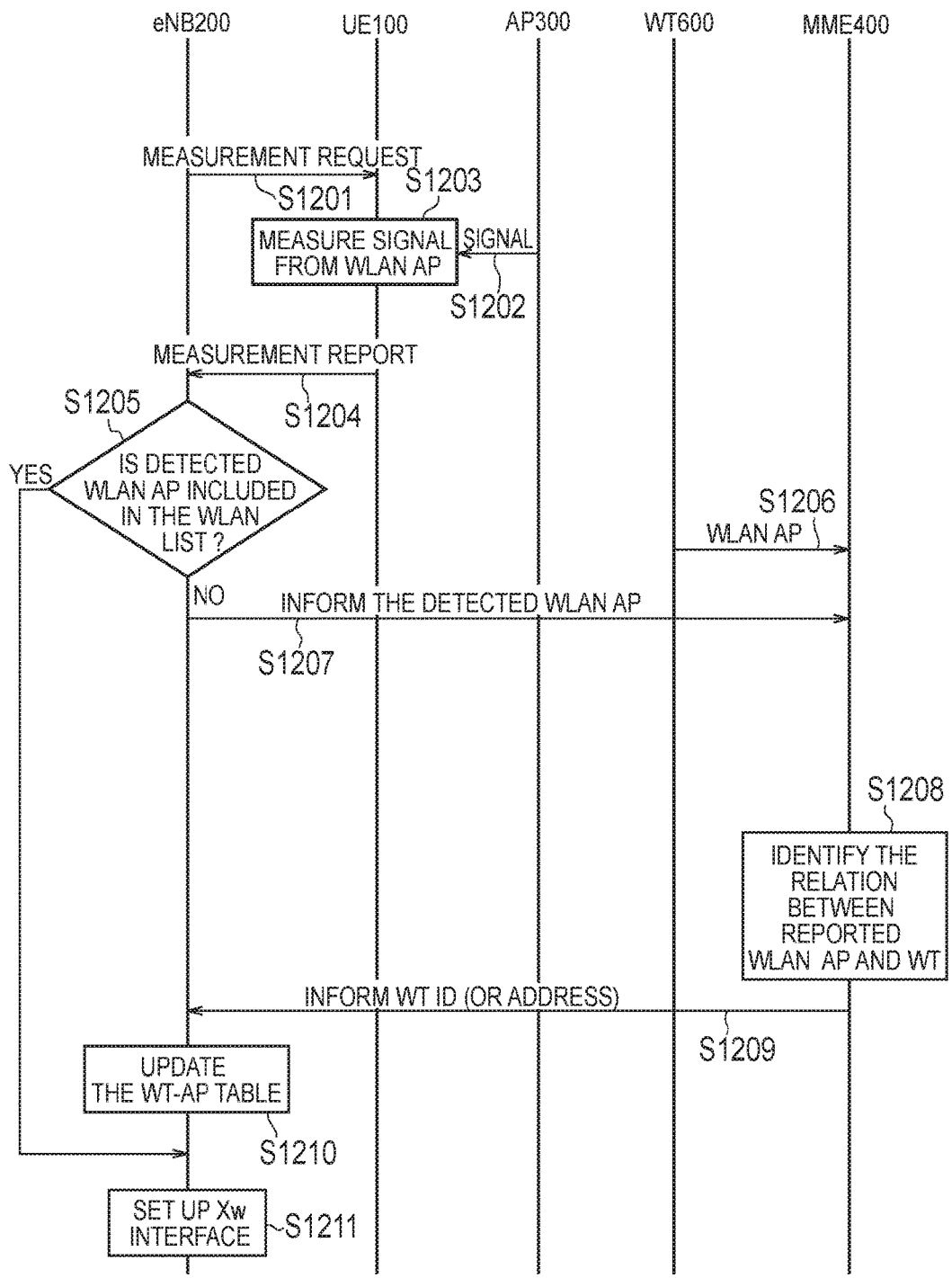
FIG. 16 is a sequence diagram for describing an operation according to another embodiment related to the second embodiment.

Next, an operation according to another embodiment related to the second embodiment will be described by using FIG. 16. FIG. 16 is a sequence diagram for describing an operation according to another embodiment related to the second embodiment. Note that description of parts similar to those described above will be omitted where appropriate.

In the above-described embodiment, the eNB 200 transmits the inquiry about the WT to the WT 600. In the present modification, the eNB 200 transmits the inquiry about the WT to an upper node (MME 400).

As illustrated in FIG. 16, steps S1201 to S1205 correspond to steps S1101 to S1105.

In step S1206, the WT 600 transmits, to the MME 400, the identification information of the AP 300 managed by the WT 600. If the AP 300 managed by the WT 600 is updated, the WT 600 may transmit the identification information of the AP 300 to the MME 400. Alternatively, the WT 600 may periodically transmit the identification information of the AP 300 to the MME 400.

The MME 400 associates the identification information of the AP 300 received from the WT 600 with the identification information of the WT 600, and stores the association. For example, the MME 400 may hold the above-described WT-AP table, and update the WT-AP table, based on the identification information of the AP 300 received from the WT 600.

Step S1207 corresponds to step S1106.

In step S1208, the MME 400 that receives the inquiry about the WT designates the WT 600 managing the AP 300 indicated by the identification information of the AP 300 included in the inquiry message. Specifically, the MME 400 designates the WT 600, based on the identification information (WT-AP table) of the AP 300 received from the WT 600. The MME 400 designates the WT 600 managing the identification information of the AP 300 that matches the identification information of the AP 300 included in the inquiry message, as the WT 600 managing the AP 300.

In step S1209, the MME 400 transmits a response to the inquiry to the eNB 200, in the same manner as in step S1108.

Here, the MME 400 may include an instruction for setting the Xw interface between the eNB 200 and the WT 600 into the response, and transmit the response to the eNB 200. The MME 400 grasps whether or not the Xw interface is set between the eNB 200 and the WT 600, and may include the instruction into the response if the Xw interface is not set. Alternatively, the MME 400 may include the instruction into the response regardless of whether or not the Xw interface is set. The eNB 200 may ignore the instruction from the MME 400, if the Xw interface is already set between the eNB 200 and the WT 600 indicated by the identification information included in the response.

Steps S1210 and S1211 correspond to steps S1109 and S1110.

Note that the eNB 200 may start, in step S1211, if the instruction for setting the Xw interface is included in the response from the MME 400, the operation for setting the Xw interface.

As described above, even when a WT 600 not known by the eNB 200 manages the AP 300, the eNB 200 can appropriately grasp the WT 600 by inquiring the MME 400.

Third Embodiment

Next, a third embodiment will be described. In the second embodiment, a case in which the eNB 200 transmits the inquiry about the WT 600, has been described. In the third embodiment, a case in which the eNB 200 does not transmit the inquiry about the WT 600, and the WT 600 transmits information of the AP 300 to the eNB 200, will be described. Note that description of parts similar to those described above will be omitted where appropriate.

(Operation According to Third Embodiment)

Figure 17:
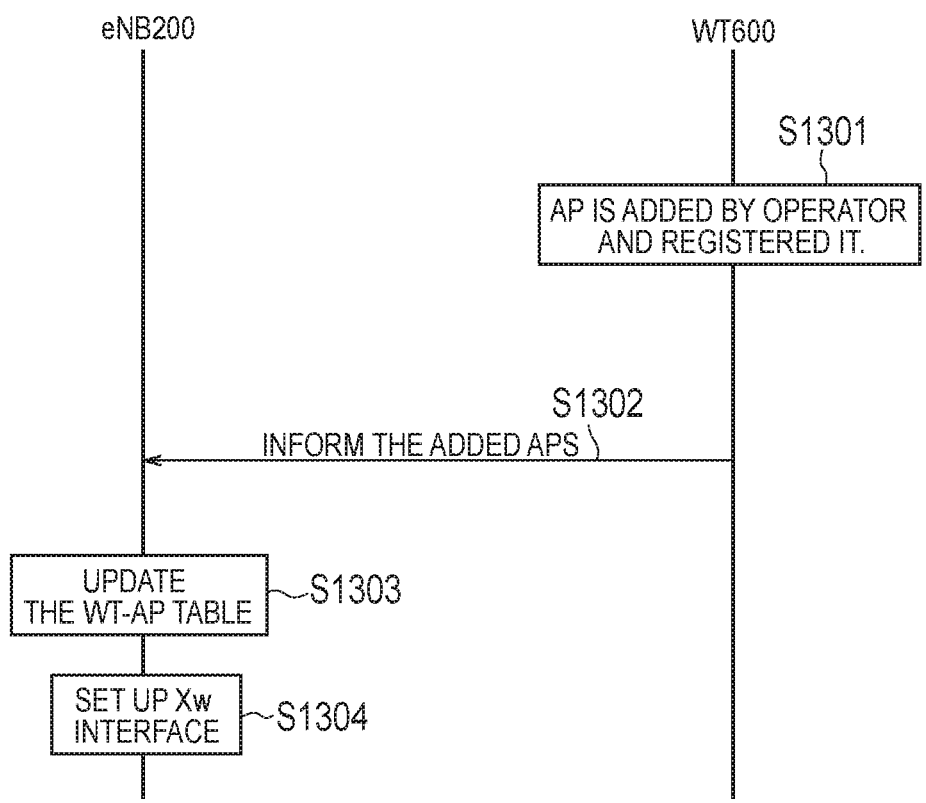
FIG. 17 is a sequence diagram for describing an operation according to a third embodiment.

An operation according to the third embodiment will be described by using FIG. 17. FIG. 17 is a sequence diagram for describing an operation according to the third embodiment.

As illustrated in FIG. 17, in step S1301, the (identification information of the) AP 300 to be managed by the operator is added to the WT 600. The WT 600 registers the added AP 300 as a management target.

In step S1302, if the AP 300 is newly registered as the management target of the WT 600, the WT 600 transmits identification information of the added AP 300 to the eNB 200.

The WT 600 has a table of all the eNBs 200 associated with the WT 600, and transmits, to the eNB 200, the identification information of the AP 300 to all the eNBs 200 in the table. For example, the WT 600 may transmit the identification information of the AP 300 to all the eNBs 200 having set the Xw interface with the WT 600, via the Xw interface. Alternatively, the WT 600 may transmit the identification information of the AP 300 to all the MMEs 400 in the MME pool area associated with the WT pool area of the WT 600. The MME 400 that receives the identification information of the AP 300 may transmit the identification information of the AP 300 to all the subordinate eNBs 200.

In step S1303, the eNB 200 associates the transmission-source WT 600 and the AP 300 indicated by the identification information, and stores the association. Specifically, in the same manner as in step S1109, the eNB 200 updates the WT-AP table, based on the identification information of the added AP 300.

The eNB 200 stores the identification information of the added P 300 (updates the WT-AP table) even if the added AP 300 is not the AP 300 having a coverage area that overlaps with at least a part of the coverage area of the eNB 200.

Step S1304 corresponds to step S1110.

As described above, the eNB 200 can appropriately grasp the WT 600 managing the AP 300, even without transmitting the inquiry based on the report from the UE 100. That is, the eNB 200 can grasp beforehand the WT 600 managing the AP 300 reported from the UE 100. Therefore, the eNB 200 does not need to perform the operation for designating an appropriate WT 600 after receiving the report from the UE 100. As a result, the eNB 200 can start the control for traffic switching much earlier.

(Operation According to Another Embodiment Related to Third Embodiment)

Figure 18:
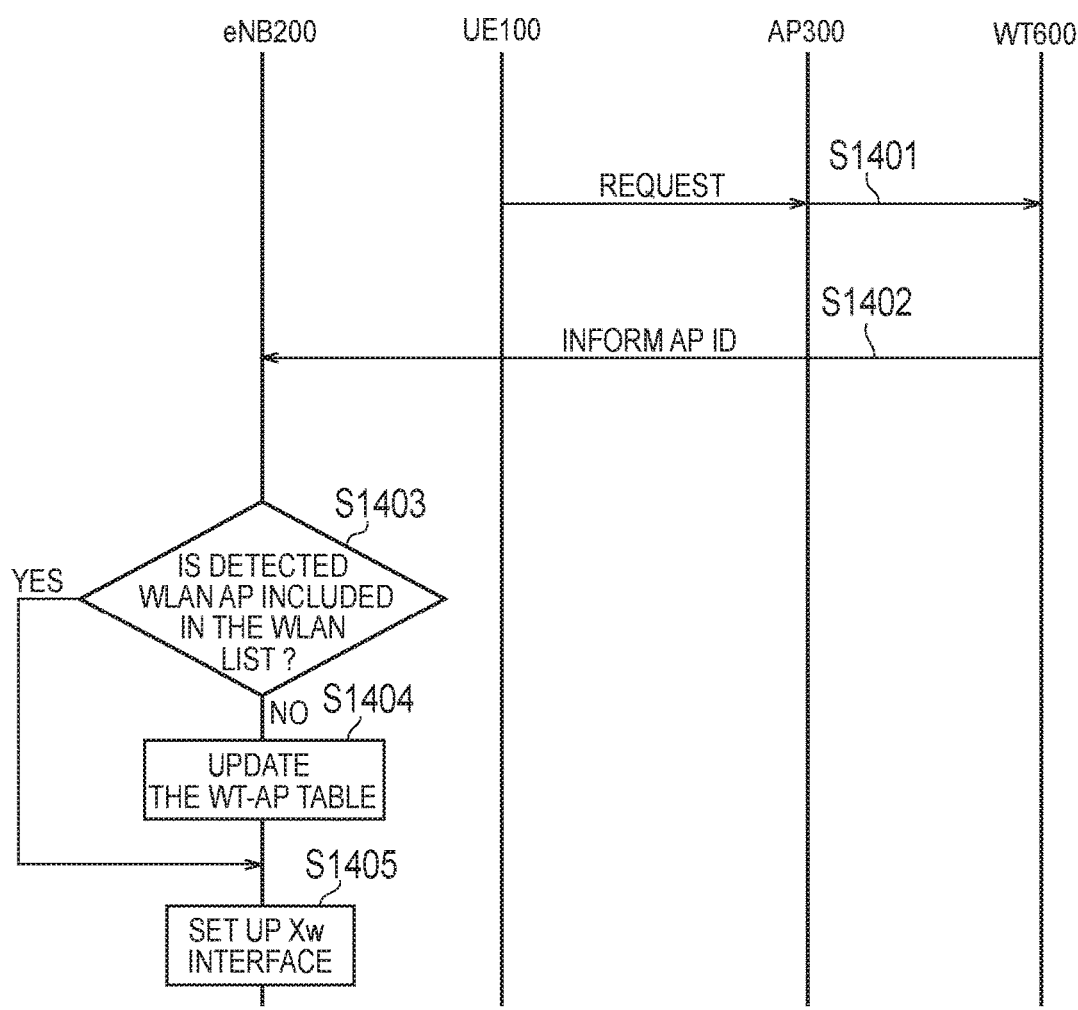
FIG. 18 is a sequence diagram for describing an operation according to another embodiment related to the third embodiment.

Next, an operation according to another embodiment related to the third embodiment will be described by using FIG. 18. FIG. 18 is a sequence diagram for describing an operation according to another embodiment related to the third embodiment. Note that description of parts similar to those described above will be omitted where appropriate.

In the above-described third embodiment, the WT 600 transmits the identification information of the AP 300 to the eNB 200, if the AP 300 is newly registered as a management target of the WT 600. In another embodiment, the WT 600 transmits the identification information of the AP 300 to the eNB 200, based on signaling from the UE 100.

As illustrated in FIG. 18, in step S1401, the UE 100 requests the WT 600 to transmit the identification information of the AP 300 to the eNB 200. Specifically, the UE 100 transmits, to the AP 300, a request for transmitting, by the WT 600, the identification information of the AP 300 to the eNB 200. The AP 300 transfers the request to the WT 600.

The UE 100 may transmit the request to the WT 600 by using an adaptation layer present in the UE 100. Specifically, the request is transmitted to the WT 600 via a logical connection established between an adaptation layer in the UE and an adaptation layer in the AP 300 or the WT 600. The request may be transmitted as a control protocol data unit (Control PDU) in the adaptation layer.

The UE 100 can include the identification information related to the eNB 200 into the request. The identification information related to the eNB 200 is an identifier of the eNB 200 (eNB ID), an identifier of the cell (cell ID), and the like.

Note that the UE 100 may transmit the request, based on an instruction from the eNB 200. For example, if performing UE-based switching control, the UE 100 may be instructed by the eNB 200 to transmit the request to the AP 300 at the switching destination.

In step S1402, the WT 600 transmits, to the eNB 200, the identification information of the AP 300 requested from the UE 100. If the request from the UE 100 includes the identification information related to the eNB 200, the WT 600 can transmit the identification information of the AP 300 to the eNB 200, based on the identification information related to the eNB 200. Specifically, the WT 600 transmits the identification information of the AP 300 to the eNB 200 designated by the identification information. The WT 600 may transmit, to the MME 400, the identification information related to the eNB 200 together with the identification information of the AP 300, and may designate the eNB 200 that performs transmission to the MME 400.

Steps S1403 to S1405 correspond to steps S1105, S1109, and S1110.

As described above, the eNB 200 can appropriately grasp the WT 600 managing the AP 300, even in a case where the eNB 200 does not transmit the inquiry based on the report from the UE 100. Further, since the signaling from the UE 100 becomes a trigger, the eNB 200 can receive the identification information of the AP 300 having a coverage area that overlaps with at least a part of the coverage area of the eNB 200.

Fourth Embodiment

Next, a fourth embodiment will be described. In the third embodiment, a case in which the eNB 200 does not transmit the inquiry about the WT 600, and the WT 600 transmits information of the AP 300 to the eNB 200, has been described. In the fourth embodiment, a case in which the UE 100 transmits information of the AP 300 and the WT 600 to the eNB 200 will be described. Note that description of parts similar to those described above will be omitted where appropriate.

(Operation According to Fourth Embodiment)

Figure 19:
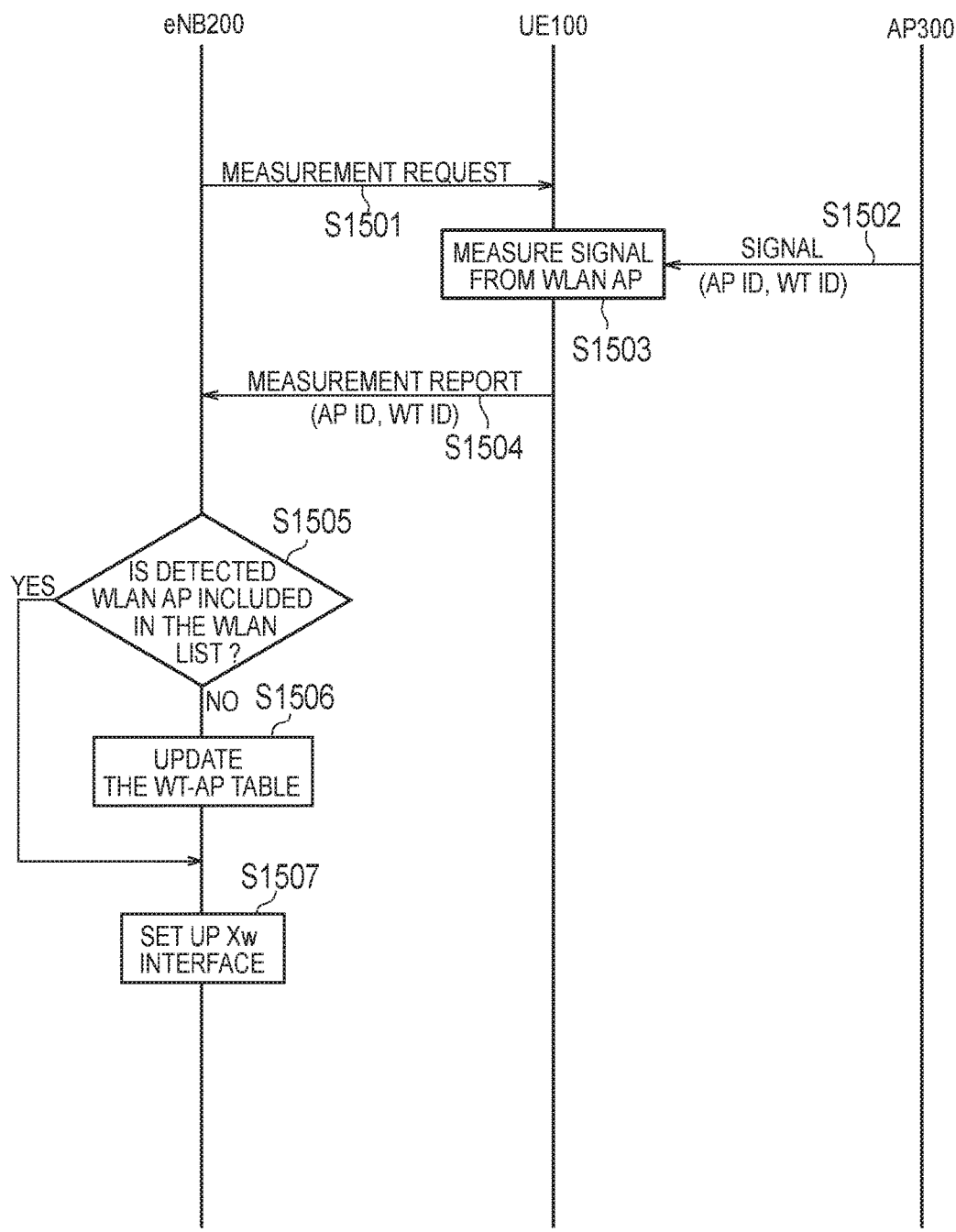
FIG. 19 is a sequence diagram for describing an operation according to a fourth embodiment.

An operation according to the fourth embodiment will be described by using FIG. 19. FIG. 19 is a sequence diagram for describing the operation according to the fourth embodiment.

In FIG. 19, step S1501 is similar to step S1101.

In step S1502, the AP 300 transmits a radio signal (beacon signal) including the identification information (such as the AP ID: BSSID) of the AP 300 and the identification information (WT ID) of the WT 600 managing the AP 300. The AP 300 can house the identification information of the WT 600 in a field that can be set arbitrarily by the network operator, for example.

If the AP 300 is a stealth AP and if information requesting the identification information of the WT 600 is included in a probe request from the UE 100, the AP 300 may transmit a beacon signal including the identification information of the WT 600.

Step S1503 corresponds to step S1103. The UE 100 acquires, by receiving a radio signal from the AP 300, not only the identification information of the AP 300, but also the identification information of the WT 600.

Step S1504 corresponds to step S1104. The UE 100 reports, to the eNB 200, not only the identification information of the AP 300, but also the identification information of the WT 600.

Steps S1505 to S1507 correspond to steps S1105, S1109, and S1110.

As described above, the eNB 200 receives, from the UE 100, not only a report on the AP 300, but also a report on the WT 600 managing the AP 300. Therefore, the eNB 200 can appropriately grasp the WT 600 managing the AP 300 reported from the UE 100.

(Operation According to Another Embodiment Related to Fourth Embodiment)

Figure 20:
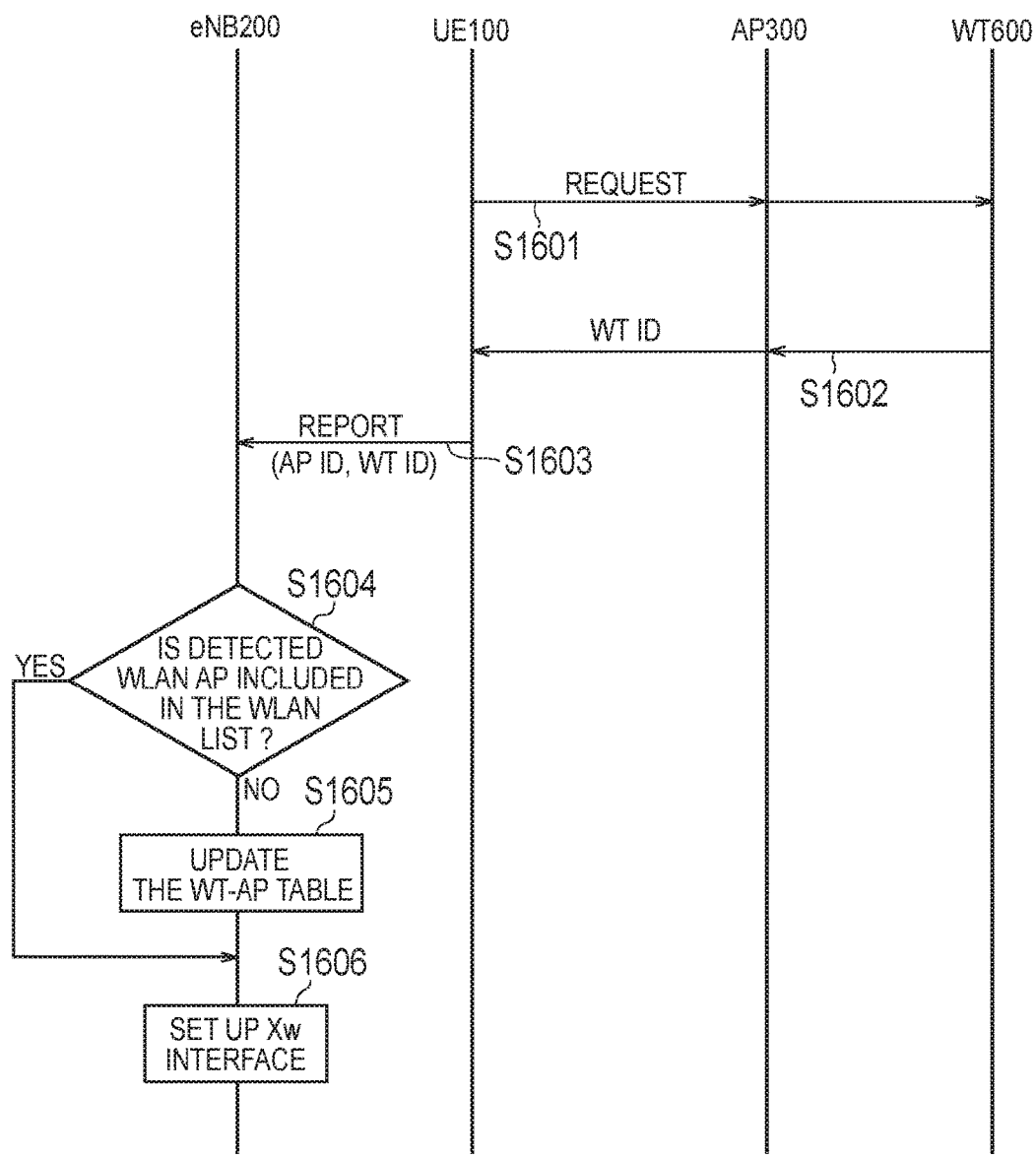
FIG. 20 is a sequence diagram for describing an operation according to another embodiment related to the fourth embodiment.

Next, an operation according to another embodiment related to the fourth embodiment will be described by using FIG. 20. FIG. 20 is a sequence diagram for describing an operation according to another embodiment related to the fourth embodiment. Note that description of parts similar to those described above will be omitted where appropriate.

In another embodiment, a case in which the UE 100 receives the identification information of the WT 600 from the WT 600 will be described.

As illustrated in FIG. 20, in step S1601, the UE 100 requests for the identification information of the WT 600, to the WT 600. Specifically, the UE 100 transmits the request to the AP 300. The AP 300 transfers the request to the WT 600. In the same manner as in step S1401, the UE 100 may transmit the request to the WT 600 by using the adaptation layer present in the UE 100. The UE 100 may include information for requesting the identification information of the WT 600 through a probe request.

Note that the UE 100 may transmit the request, based on an instruction from the eNB 200. For example, if performing UE-based switching control, the UE 100 may be instructed by the eNB 200 to transmit the request to the AP 300 at the switching destination.

In step S1602, the WT 600 transmits the identification information of the WT 600 to the UE 100 via the AP 300. The AP 300 includes the identification information of the WT 600 into a response to the request from the UE 100, and transmits the response to the UE 100. The AP 300 may include the identification information of the WT 600 into a probe response, or may include the identification information of the WT 600 into another radio signal (for example, a beacon signal).

Note that the WT 600 may transmit the identification information of the WT 600 to the UE 100 by using the adaptation layer present in the WT 600 (or the AP 300). The identification information of the WT 600 may be transmitted as a control protocol data unit (Control PDU) in the adaptation layer.

Note that if the AP 300 already knows the identification information of the WT 600, the AP 300 may respond instead of the WT 600. That is, the AP 300 may omit the transfer of the request from the UE 100, and may transmit the identification information of the WT 600 to the UE 100.

The UE 100 receives the identification information of the WT 600 from the AP 300.

Step S1603 corresponds to step S1504. Steps S1604 to S1606 correspond to steps S1105, S1109, and S1110.

As described above, the eNB 200 receives, from the UE 100, not only a report on the AP 300, but also a report on the WT 600 managing the AP 300. Therefore, the eNB 200 can appropriately grasp the WT 600 managing the AP 300 reported from the UE 100.

Fifth Embodiment

Next, a fifth embodiment will be described. Description of parts similar to those described above will be omitted where appropriate.

(Operation Environment)

Figure 21:
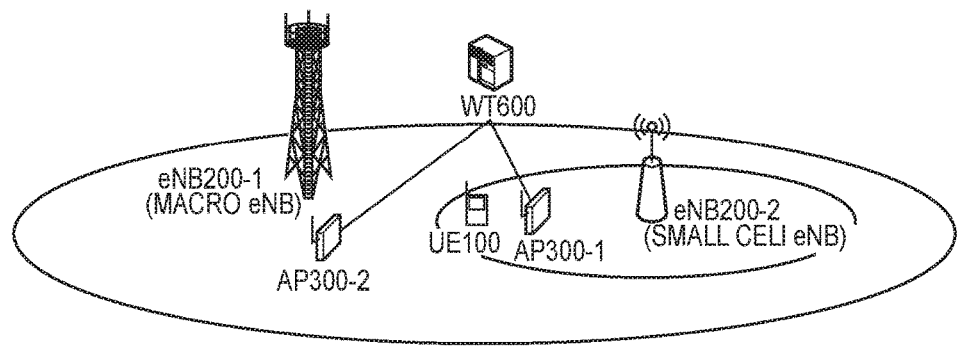
FIG. 21 is a diagram illustrating an operation environment according to a fifth embodiment.

An operation environment according to the fifth embodiment will be described by using FIG. 21, below. FIG. 21 is a diagram illustrating the operation environment according to the fifth embodiment.

In FIG. 21, the UE 100 is located in a macro cell managed by an eNB (Macro eNB) 200-1 managing macro cells. The UE 100 is also located in a small cell managed by an eNB (Small cell eNB) 200-2 managing small cells having a coverage smaller than that of macro cells. The UE 100 establishes an RRC connection with the eNB 200-2, and is in an RRC connected state.

Further, an AP 300-1 is located in the macro cell and the small cell, and an AP 300-2 is located in the macro cell. The AP 300-1 and the AP 300-2 are managed by the WT 600.

Here, the UE 100 detects the AP 300-1 by receiving a beacon signal from the AP 300-1. It is assumed that the UE 100 reports, to the eNB 200-2, an AP identifier (WLAN identifier) that is identification information of the AP 300-1. If not grasping the WT 600 managing the AP 300-1, the eNB 200-2 may not be able to set an Xw interface with an appropriate WT 600 even upon receiving the AP identifier of the AP 300-1 from the UE 100.

Particularly, the eNB and the AP managing small cells are often additionally arranged, and thus, there is a possibility that the eNB 200-2 does not grasp the WT 600. Here, if the operator investigates the AP present in the cell coverage of the eNB 200-2, the load of the operator will increase, and at the same time, the advantages of the WLAN that can be easily set will be lost.

Thus, a method by which the eNB 200-2 can appropriately grasp the AP 300 and the WT 600 will be described, below.

Note that the below-described process (operation) executed by the UE 100 is executed by at least any one of the receiver 110, the transmitter 120, and the controller 130 included in the UE 100, but is described as a process executed by the UE 100 for the purpose of convenience. Similarly, the below-described process (operation) executed by the eNB 200 is executed by at least any one of the receiver 210, the transmitter 220, the controller 230, and the network interface 240 included in the eNB 200, but is described as a process executed by the eNB 200 for the purpose of convenience. Similarly, the below-described process (operation) executed by the AP 300 is executed by at least any one of the receiver 310, the transmitter 320, the controller 330, and the network interface 340 included in the AP 300, but is described as a process executed by the AP 300 for the purpose of convenience. Similarly, the below-described process (operation) executed by the WT 600 is executed by at least any one of the controller 630 and the network interface 640 included in the WT 600, but is described as a process executed by the WT 600 for the purpose of convenience.

A fifth embodiment will be described. In the fifth embodiment, a case in which the eNB 200-2 transmits an inquiry to the eNB 200-1 will be described.

(Operation According to Fifth Embodiment)

Figure 22:
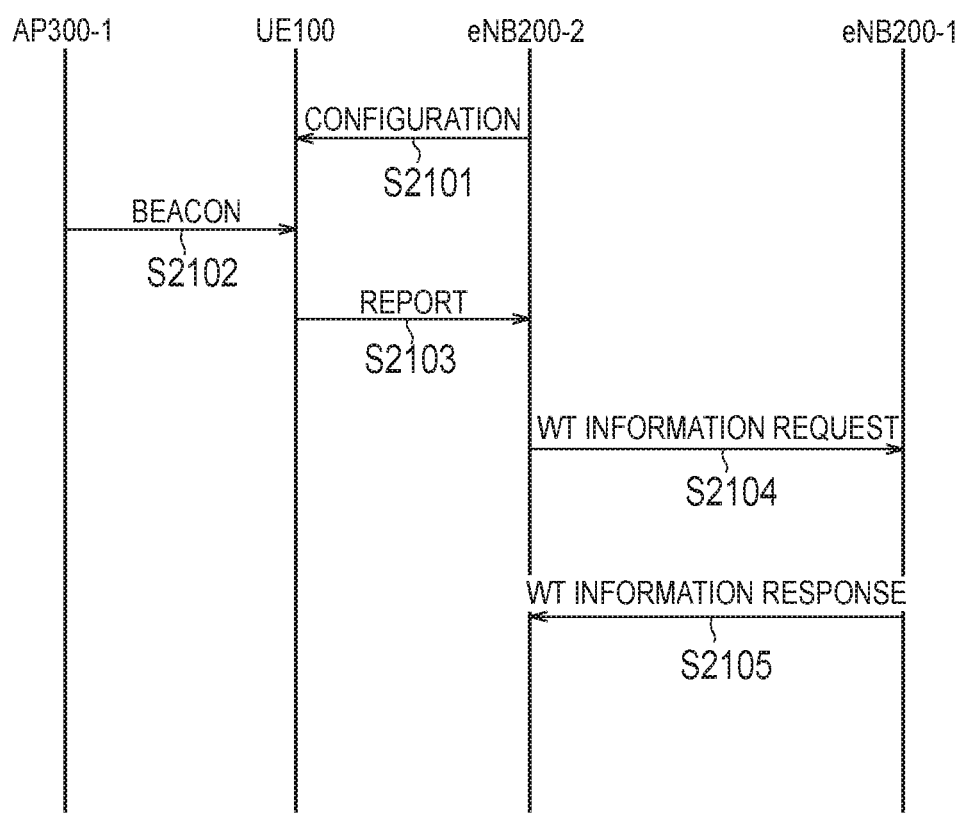
FIG. 22 is a sequence diagram for describing an operation according to the fifth embodiment.

An operation according to the fifth embodiment will be described by using FIG. 22 and FIG. 23. FIG. 22 is a sequence diagram for describing the operation according to the fifth embodiment. FIG. 23 shows an example of a table for describing the operation according to the fifth embodiment.

In the fifth embodiment, the UE 100 is in an RRC connected state with respect to the eNB 200-2.

As illustrated in FIG. 22, in step S2101, the eNB 200-2 performs a configuration for a report on the AP 300, in the UE 100. Specifically, the eNB 200-2 transmits, to the UE 100, control information for requesting, if an AP 300 is detected, reporting of the detected AP 300 to the eNB 200-2. The UE 100 performs a configuration, based on the control information. The control information may include an identifier (for example, an SSID, a BSSID, an ESSID, etc.) for identifying the AP 300 being a target to be reported.

In step S2102, the AP 300-1 transmits a beacon signal including an identifier (for example, an SSID, a BSSID, an ESSID, etc.) of the AP 300-1. The UE 100 that performs scanning based on the configuration receives the beacon signal from the AP 300-1.

In step S2103, the UE 100 performs reporting on the AP 300-1. Specifically, the UE 100 transmits a report including the identifier of the AP 300-1 to the eNB 200-2. Note that the UE 100 can transmit to the eNB 200-2, based on the configuration, a report including identifiers of the APs 300 other than the AP 300-1 (for example, a report including identifiers of all detected APs 300). The eNB 200-2 receives the report including the identifier of the AP 300-1 from the UE 100-2.

The UE 100 may perform reporting to the eNB 200-2, with the fact that the signal strength from an adjacent cell (base station) exceeds a threshold value as the trigger. Specifically, the UE 100 may perform reporting to the eNB 200-2, based on an A4 trigger (Neighbour becomes better than threshold) or a B1 trigger (Inter RAT neighbour becomes better than threshold).

The eNB 200-2 grasps, based on the report, that the AP 300-1 detected by the UE 100 is located in the cell coverage. The eNB 200-2 determines whether or not the eNB 200-2 knows the WT 600 managing the AP 300-1. Specifically, the eNB 200-2 makes a determination, based on the WLAN list in which the AP and the WT are associated. The eNB 200-2 terminates the process if the eNB 200-2 knows the WT 600 managing the AP 300-1. On the other hand, the eNB 200-2 executes a process of step S2104 if the eNB 200-2 does not know the WT 600.

In step S2104, the eNB 200-2 transmits an inquiry about the WT 600 (WT information request) to the eNB 200-1 which is an adjacent base station. As shown in FIG. 23A, the inquiry includes the identifier of the AP 300-1. As shown in FIG. 23A, the inquiry may include the identifier of a plurality of APs. Further, the inquiry may include a plurality of identifiers (the BSSID, the SSID) indicating the same AP.

The eNB 200-2 may transmit the inquiry only to a target set from an OAM. The eNB 200-2 may transmit the inquiry to the eNB that used to be in a relationship of a master eNB and a secondary eNB in the dual connectivity, in the past. Specifically, if the eNB 200-1 is the master eNB and the eNB 200-2 is the secondary eNB, the eNB 200-2 may transmit the inquiry to the eNB 200-1.

The eNB 200-1 determines, based on the WLAN list held by the eNB 200-1, whether or not the eNB 200-1 knows the WT 600 managing the AP 300-1. If the eNB 200-1 knows the WT 600, the eNB 200-1 executes a process of step S2105. On the other hand, if the eNB 200-1 does not know the WT 600, the eNB 200-1 may make an inquiry to another node.

For example, the eNB 200-1 may further make an inquiry to the adjacent eNB 200. The eNB 200-1 may inquire the adjacent eNB 200, by transferring the inquiry from the eNB 200-2. The eNB 200-1 executes the process of step S2105, based on a response from the adjacent eNB 200. The frequency at which the eNB 200-1 inquires the adjacent eNB 200 may be dependent on the implementation, or may be set from the OAM.

Further, the eNB 200-1 may make an inquiry to a node managing the WLAN list in which the AP and the WT are associated. For example, the eNB 200-1 may make an inquiry to the OAM, or may make an inquiry to a WT that is already known by the eNB 200-1. The eNB 200-1 may make an inquiry to the OAM that can acquire the information about the WT 600 from both the OAM within the cellular network and the OAM within the WLAN.

Note that the eNB 200-1 may report the identifier of the AP 300-1 to the OAM. If holding the WLAN list in which the AP and the WT are associated, the OAM can update the WLAN list. The OAM may adjust, based on the updated WLAN list, a parameter included in assistance information.

In step S2105, the eNB 200-1 transmits, to the eNB 200-2, a response to the inquiry about the WT 600 (WT information response). Specifically, the eNB 200-1 transmits, to the eNB 200-2, if the eNB 200-1 knows the WT 600 managing the AP 300-1, the identifier for identifying the WT 600 (the WT ID (for example, the IP address of the WT)) together with the identifier of the AP 300-1 (the AP ID). As shown in FIG. 23B, the eNB 200-1 includes the identifier of the WT 600 and the identifier of the AP 300-1 into a response message, and transmits the response message to the eNB 200-2. The response message may include information necessary for setting up the Xw interface. Further, the response message may include, if the AP 300-1 is managed by a plurality of WTs, a list of the WTs (WTs List). Further, the response message may include, if the WT 600 manages a plurality of APs, the identifier of the APs other than the AP 300-1.

The eNB 200-1 may transmit, to the eNB 200-2, if the eNB 200-1 does not know the WT 600, a response message including information indicating not knowing the WT 600. Specifically, the eNB 200-1 may transmit, to the eNB 200-2, a rejection message (Reject) including a reason (Cause value) indicating not knowing the identifier of the AP 300-1.

If receiving the inquiry of step S2104, the eNB 200-1 may determine that the AP 300-1 is located in the coverage of the eNB 200-2, and transmit a response to the query of step S2105 to the eNB 200-2.

The eNB 200-2 can update the WLAN list, if the eNB 200-2 grasps the WT 600 managing the AP 300-1. Further, the eNB 200-2 may set the Xw interface with the WT 600.

Sixth Embodiment

Figure 24:
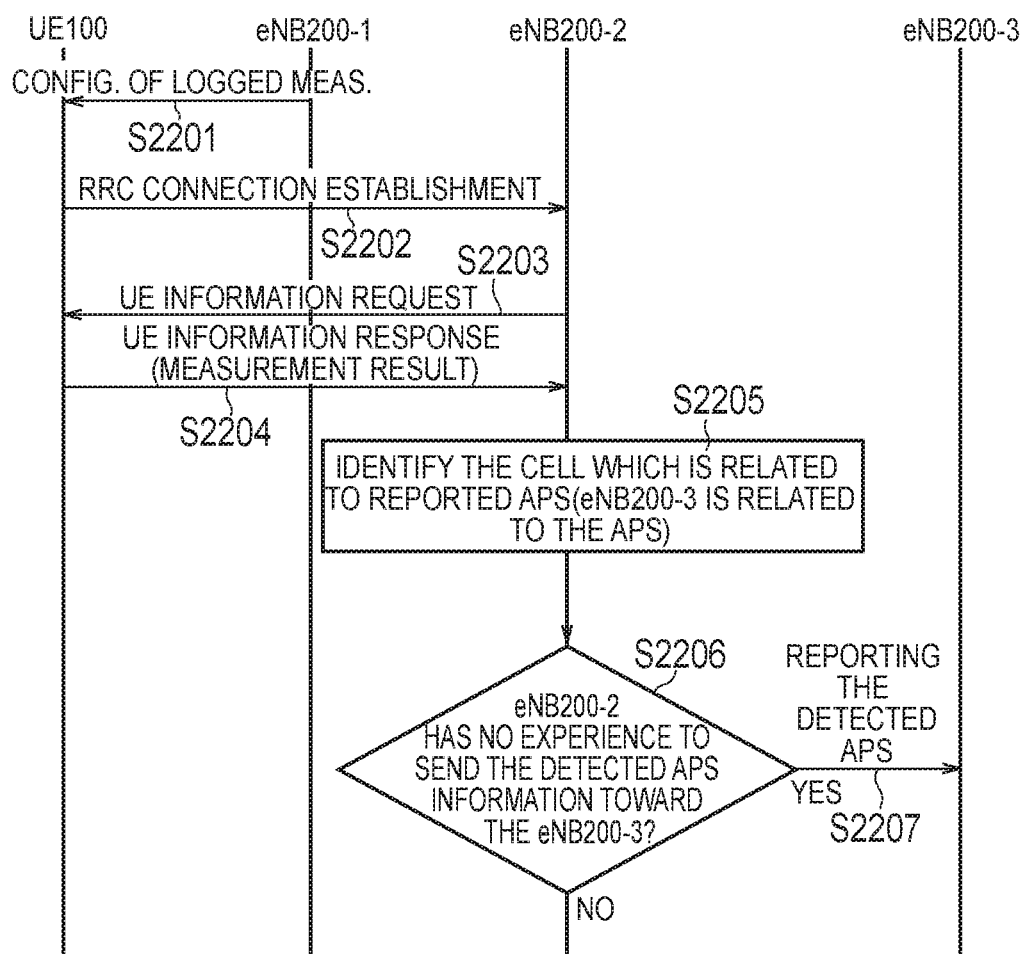
FIG. 24 is a sequence diagram for describing an operation according to a sixth embodiment.

Next, a sixth embodiment will be described by using FIG. 24. FIG. 24 is a sequence diagram for describing an operation according to the sixth embodiment.

In the fifth embodiment, the UE 100 is in an RRC connected state with respect to the eNB 200-2, and executes detection (scanning) of an AP. In the sixth embodiment, the UE 100 is in an RRC idle state, and executes detection (scanning) of the AP. Note that description of parts similar to those in the fifth embodiment will be omitted where appropriate.

As illustrated in FIG. 24, in step S2201, the eNB 200-1 transmits, to the UE 100, configuration information on an MDT (Minimization of Drive Test). For example, the setting information is configuration information (Config. of Logged meas.) on a storage type MDT (Logged MDT). Note that the configuration information is information for performing measurement of at least an AP.

Note that, in the Logged MDT, the UE 100 in the RRC idle state performs measurement of a radio environment according to a measurement parameter configured from a network (eNB 200-1), and stores, as measurement data, a result of the measurement together with location information and time information. The UE 100 reports the measurement data to the network, after transitioning to the RRC connected state.

The configuration information may include control information for designating the AP 300 that is a target of a report on the AP 300. The UE 100 performs measurement and stores the measurement data, based on the configuration information.

The UE 100 may store, if detecting the AP 300 (that is, if receiving a beacon signal from the AP 300), the identifier (Cell ID (for example, ECGI (E-UTRAN Cell Global Identifier)) of the cell detected when the AP 300 is detected. Further, the UE 100 may store the time when the AP 300 is detected, or may store the time when the cell is detected.

In step S2202, the UE 100 transmits, to the eNB 200-2, an RRC connection establishment message for establishing an RRC connection. The RRC connection establishment message may include information indicating that the measurement data is stored. Thereafter, the RRC connection is established between the UE 100 and the eNB 200-2.

In step S2203, the eNB 200-2 transmits a UE information request message (UE Information Request). The eNB 200-2 may transmit the UE information request message, if the UE 100 stores the measurement data.

In step S2204, the UE 100 transmits, to the eNB 200-2, a UE information response message which is a response to the UE information request message. The UE information response message includes the measurement data (Measurement result). As a result, the eNB 200 receives the measurement data (a report on the AP 300) from the UE 100. Note that the measurement data includes the identifier of the AP 300 and the identifier of the cell recorded when the UE 100 is in the idle state.

In step S2205, the eNB 200-2 designates a cell related to the reported AP. That is, the eNB 200-2 designates an eNB 200 that manages the cell in which the AP 300 identified by the identifier of the AP 300 included in the measurement data is located. Specifically, the eNB 200-2 designates the eNB 200 (cell) by the identifier of the cell included in the measurement data. The eNB 200-2 may designate the eNB 200 (cell), based on the time information indicating the time when the AP 300 and/or the cell is detected. In the present embodiment, the eNB 200-2 designates the eNB 200-3. That is, the eNB 200-2 determines that the AP 300 is located in the cell managed by the eNB 200-3.

Further, the eNB 200-2 determines whether or not the eNB 200-2 knows the WT 600 managing the AP 300 identified by the identifier of the AP 300 included in the report. In the same manner as in the first embodiment, the eNB 200-2 determines whether or not the eNB 200-2 knows the WT 600. If not knowing the WT 600, the eNB 200-2 may grasp the WT 600 by making an inquiry to another node, in the same manner as in the first embodiment.

In step S2206, the eNB 200-2 determines whether or not the eNB 200-3 knows the information on the AP 300 (the identifier of the AP 300 and the identifier of the WT 600). If determining that the eNB 200-3 does not know the information on the AP 300, the eNB 200-2 executes a process step S2207. Otherwise, the eNB 200-2 terminates the process. For example, the eNB 200-2 determines, if the eNB 200-2 has experience transmitting the information on the detected AP 300 to the eNB 200-3, that the eNB 200-3 knows the information on the AP 300. Further, if information on the AP within the coverage (subordinate AP) and the WT related to the AP (for example, the WLAN list) is shared among the eNBs 200, the eNB 200-2 may determine, based on the WLAN list in the eNB 200-3, whether or not the eNB 200-3 knows the information on the AP 300.

In step S2207, the eNB 200-2 transmits, to the eNB 200-3 managing a target cell, the report on the AP 300 (Reporting the detected APs). The report on the AP 300 can include information similar to that shown in FIG. 23B. That is, the eNB 200-2 transmits, to the eNB 200-3, the identifier of the WT 600 together with the identifier of the AP 300.

The eNB 200-3 can update the WLAN list, based on the report on the AP 300. Further, the eNB 200-3 may set the Xw interface with the WT 600. In this way, the eNB 200-3 can appropriately grasp the WT 600 managing the AP 300.

Note that if the eNB 200-3 knows the information on the AP 300, the eNB 200-2 may omit the transmission of the report on the AP 300 (the identifier of the WT 600 and the identifier of the AP 300).

Further, if the eNB 200-3 is not an adjacent eNB, the eNB 200-2 may omit the transmission of the report on the AP 300. The eNB 200-2 may determine that the eNB 200-3 is not an adjacent eNB, if an X2 interface is not set up with the eNB 200-3, for example.

Another Embodiment Related to Sixth Embodiment

Next, another embodiment related to the sixth embodiment will be described. The above-described sixth embodiment describes a case in which the eNB 200-2 grasps the WT 600 managing the AP 300 reported from the UE 100. Another embodiment describes a case in which the eNB 200-2 does not grasp the WT 600 managing the AP 300.

After receiving the measurement data (report) from the UE 100, if the eNB 200-2 does not know the WT 600 managing the AP 300 reported from the UE 100, the eNB 200-2 can transmit a report to the OAM.

The OAM designates, based on the identifier of the cell and/or the time information included in the report transmitted from the eNB 200-2, the eNB 200 managing a cell in which the AP 300 is located. Further, the OAM informs, based on the WLAN list held by the OAM, the designated eNB 200-3 of the identifier of the WT 600 together with the identifier of the AP 300. Note that in the same manner as in the second embodiment, if the eNB 200-3 already knows the WT 600, the OAM can omit the transmission of the identifier of the WT 600, etc.

As described above, the eNB 200-3 can appropriately grasp the WT 600 managing the AP 300.

Seventh Embodiment

Figure 25:
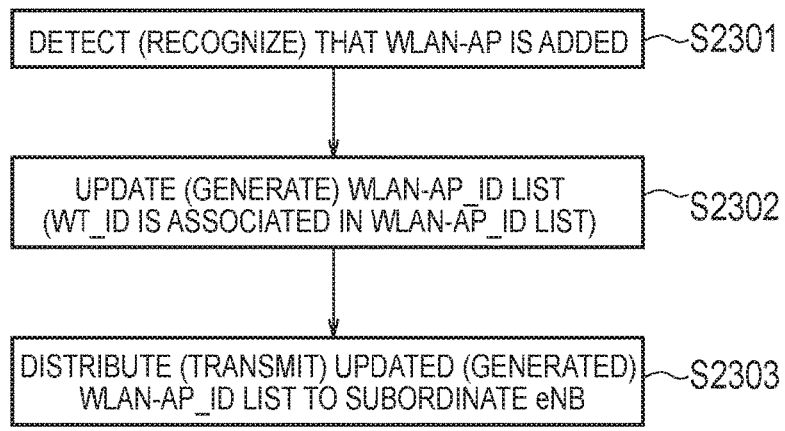
FIG. 25 is a diagram for describing an operation of a WT according to a seventh embodiment.
Figure 26:
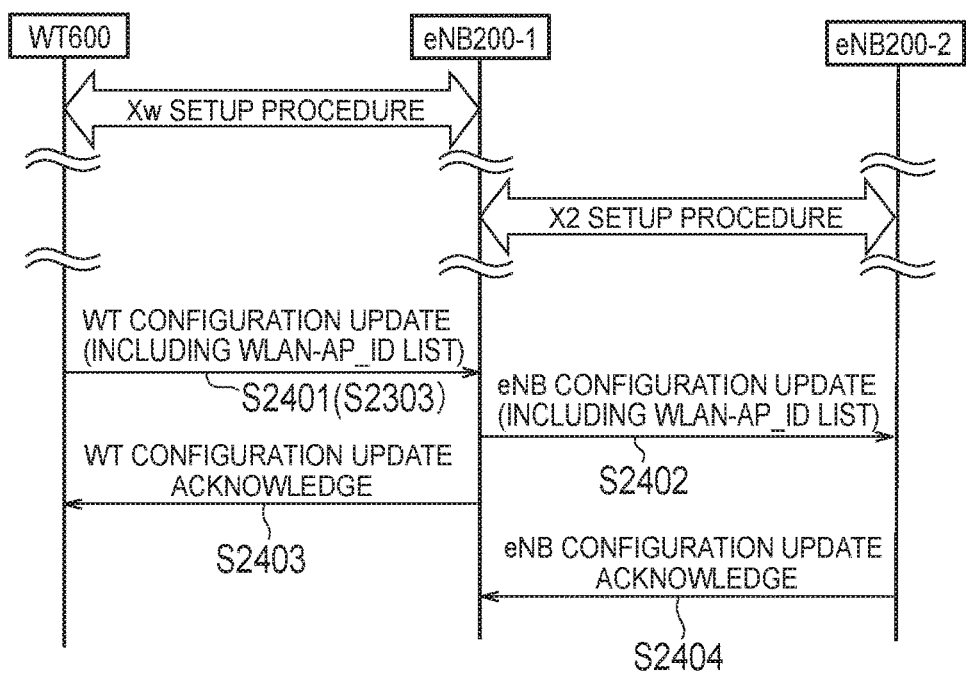
FIG. 26 is a sequence diagram for describing an operation (part 1) according to the seventh embodiment.
Figure 28:
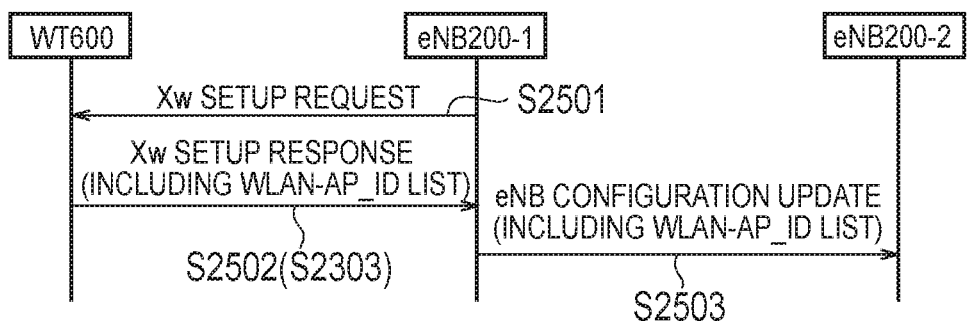
FIG. 28 is a sequence diagram for describing an operation (part 2) according to the seventh embodiment.
Figure 29:
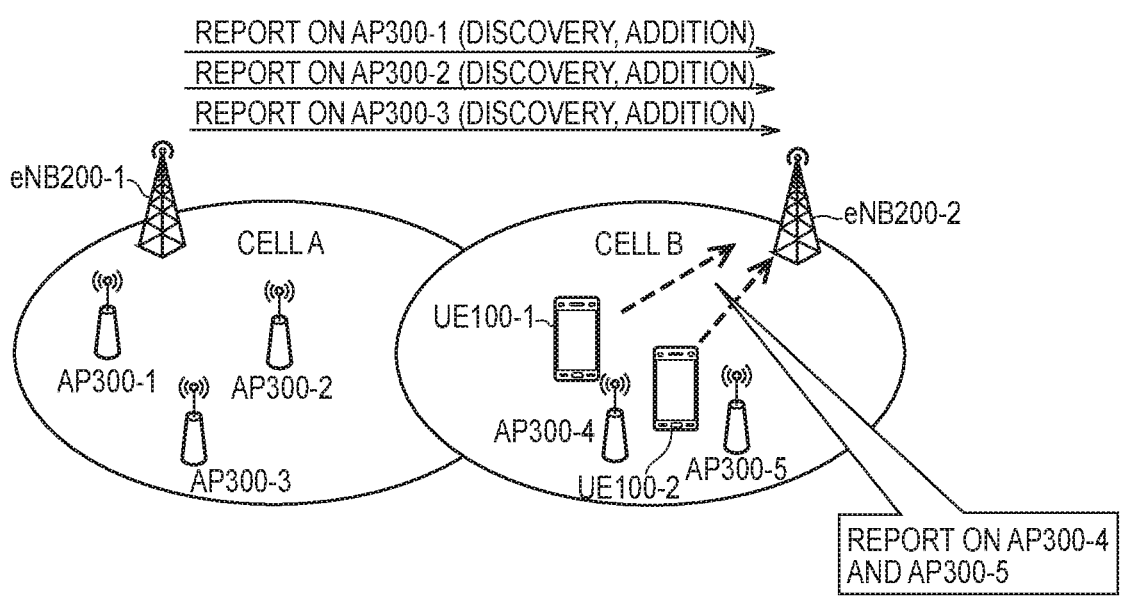
FIG. 29 is a diagram for describing the operation according to the seventh embodiment.

Next, a seventh embodiment will be described by using FIG. 25 to FIG. 29. FIG. 25 is a diagram for describing an operation of the WT according to the seventh embodiment. FIG. 26 is a sequence diagram for describing an operation (part 1) according to the seventh embodiment. FIG. 27 shows an example of a table for describing an operation according to the seventh embodiment. FIG. 28 is a sequence diagram for describing an operation (part 2) according to the seventh embodiment. FIG. 29 is a diagram for describing the operation according to the seventh embodiment.

In the fifth and sixth embodiments, the eNB 200 transmits, based on the report from the UE 100, the identifier of the WT 600 to another eNB 200. In the seventh embodiment, the eNB 200 transmits, based on a notification from the WT 600, the identifier of the WT 600 to another eNB 200.

As illustrated in FIG. 25, in step S2301, the WT 600 detects (recognizes) that an AP 30 managed by the WT 600 is added. For example, the WT 600 recognizes that an AP 300 is added as a result of the setup of a new AP 300 by the operator.

In step S2302, the WT 600 updates (generates) a WLAN-AP ID list, which is a list of (the identifiers of) APs managed by the WT 600. The identifiers of the WTs 600 are associated in the WLAN-AP ID list.

In step S2303, the WT 600 distributes (transmits) the updated (generated) WLAN-AP ID list to the subordinate eNB 200. That is, the WT 600 can deliver the WLAN-AP ID list to the subordinate eNB 200 with the update of the WLAN-AP ID list as the trigger. A flow of the WLAN-AP ID list will be described by using FIG. 26, below.

As illustrated in FIG. 26, an Xw setup procedure is executed between the WT 600 and the eNB 200-1. Therefore, the Xw interface is setup between the WT 600 and the eNB 200-1. Further, an X2 setup procedure is executed between the eNB 200-1 and the eNB 200-2. Therefore, the X2 interface is setup between the eNB 200-1 and the eNB 200-2. Note that the X2 setup procedure may be executed before the Xw setup procedure.

As illustrated in step S2401, the WT 600 transmits, to the eNB 200-1, a WT configuration update message (WT CONFIGURATION UPDATE) via the Xw interface. The WT configuration update message includes the WLAN-AP ID list. As a result, the eNB 200-1 can grasp the AP 300 managed by the WT 600. The eNB 200-1 may update, based on the WLAN-AP ID list, the WLAN list held by the eNB 200-1. Further, if having received the WLAN-AP ID list from the WT 600 in the past, the eNB 200-1 may update the WLAN-AP ID list.

In step S2402, the eNB 200-1 transmits, to the eNB 200-2, an ENB configuration update message (ENB CONFIGURATION UPDATE) via the X2 interface. The ENB configuration update message includes the WLAN-AP ID list. An example of information included in the ENB configuration update message is shown in FIG. 27. As shown in FIG. 27, the ENB configuration update message includes information necessary for setting up the Xw interface ("Served WT information"). The ENB configuration update message includes not only the identifier of the WT 600 (WT ID), but also the identifier of the AP 300 managed by the WT 600 (the BSSID, the SSID, and the ESSID). The ENB configuration update message may include a plurality of identifiers indicating the same AP 300. Further, the ENB configuration update message may include a plurality of SSIDs, if the AP 300 is a multi-SSID apparatus. The ENB configuration update message ("frequency information") may include information such as a used frequency band, a used channel, etc. of the AP 300.

Further, in the WT 600, if a change occurs in the WLAN-AP ID list, the information on the changed AP 300 may be included in a field called "Served WTs to Modify" instead of "Served WTs to Add". Further, if a change occurs in the WLAN-AP ID list, the identifier of the deleted AP 300 (such as the BSSID, the SSID, the ESSID, etc.) and/or the identifier of the deleted WT 600 (WT ID) may be included in a field called "Served WTs to Delete" instead of "Served WTs to Add".

The eNB 200-2 receives, based on the ENB configuration update message from the eNB 200-1, the identifier of the WT 600 together with the identifier of the AP 300. As a result, the eNB 200-2 can grasp the WT 600 managing the AP 300.

In step S2403, the eNB 200-1 transmits, to the WT 600, an acknowledgment to the ENB configuration update message (WT CONFIGURATION UPDATE ACKNOWLEDGE) via the Xw interface.

In step S2404, the eNB 200-2 transmits, to the eNB 200-1, an acknowledgment to the ENB configuration update message (ENB CONFIGURATION UPDATE ACKNOWLEDGE) via the X2 interface.

Note that as illustrated in FIG. 28, the WT 600 may transmit the WLAN-AP ID list to the eNB 200-1 by a message other than the WT configuration update message (WT CONFIGURATION UPDATE).

In FIG. 28, as illustrated in step S2501, the eNB 200-1 transmits, to the WT 600, an Xw setup request message (Xw SETUP REQUEST) for setting up the Xw interface.

In step S2502, the WT 600 may include the WLAN-AP ID list into an Xw setup response message (Xw SETUP RESPONSE) that is a response to the Xw setup request message, and transmit the Xw setup response message to the eNB 200-1. As a result, the WT 600 can transmit the WLAN-AP ID list to the eNB 200-1, even if the Xw interface is not set up.

Step S2503 corresponds to step S2402.

Note that if receiving the WLAN-AP ID list from the eNB 200-1, the eNB 200-2 updates the WLAN list in which the AP and the WT included within the coverage of the eNB 200-2 are associated. Further, the eNB 200-2 can update the WLAN list, based on the report on the AP 300 from at least any one of the UE 100, another eNB 200, and the WT 600. Specifically, the eNB 200-2 can update the WLAN list by at least any one of the methods.

In a first method, the eNB 200-2 deletes, from the WLAN list, the identifier of the AP 300 not reported from the UE 100 within a predetermined period. The eNB 200-2, for example, starts a specific timer with the update of the WLAN list as a trigger. The eNB 200-2 may determine, before the specific timer expires, that the AP 300 not reported from the UE 100 is not located within the coverage of the cell of the eNB 200-2, and delete the identifier of the AP 300 from the WLAN list.

In a second method, the eNB 200-2 deletes, from the WLAN list, the identifier of the AP 300 subordinate to another eNB. For example, if receiving, as a report on the AP 300 from another eNB 200 (for example, a neighbour eNB 200), an ENB configuration update message including the identifier of an AP 300 located within the coverage of a cell managed by another eNB 200, the eNB 200-2 may determine that the AP 300 is not located in the coverage of the cell managed by the eNB 200-2, and delete the identifier of the AP 300 from the WLAN list.

In a third method, the eNB 200-2 deletes the identifier of the AP 300 from the WLAN list, based on the report on the AP300 from the UE 100 and the report on the AP 300 from the eNB 200-1.

For example, as illustrated in FIG. 29, the eNB 200-2 receives a report on an AP 300-4 and an AP 300-5 from the UE 100-1 and the UE 100-2. Further, the eNB 200-2 receives a report on an AP 300-1 from the eNB 200-1. The report on the AP 300-1 includes information indicating that the AP 300-1 is discovered, and the eNB 200-1 adds the AP 300-1 to the WLAN list. Similarly, the eNB 200-2 receives a report on an AP 300-2 and an AP 300-3 from the eNB 200-1.

The eNB 200-2 determines, based on the report from the eNB 200-1 and the report from the UE 100, that the AP 300 is not present in an area (overlapping area) where the coverage of the eNB 200-1 and the coverage of the eNB 200-2 overlap. That is, the eNB 200-2 determines that the AP 300 included in both the report from the eNB 200-1 and the report from the UE 100-1 is located in the overlapping area. If determining that the AP is not present in the overlapping are, the eNB 200-2 deletes, from the WLAN list, the identifier of the AP 300 reported from the eNB 200-1. On the other hand, the eNB 200-2 does not delete, from the WLAN list, the AP 300 that is determined to be present in the overlapping area even if the AP 300 is reported from the eNB 200-1.

In a fourth method, the eNB 200-2 deletes, from the WLAN list, based on the report on the AP300 from the WT 600 (for example, the WLAN-AP ID list), an identifier of a predetermined AP 300. For example, the eNB 200-2 deletes the identifier of the predetermined AP 300 from the WLAM list, if the identifier of the predetermined AP 300 has been deleted from the WLAN-AP ID list informed from the WT 600.

As described above, the eNB 200-2 updates the list, based on the report on the AP 300 from at least any one of the UE 100, another eNB 200, and the WT 600. As a result, the eNB 200-2 can appropriately update the WLAN list.

Other Embodiments

The contents of the present application are described through each of the above-described embodiments, but it should not be understood that the discussion and the drawings constituting a part of this disclosure limit to the contents of the present application. From this disclosure, various alternative embodiments, examples, and operational technologies will be obvious to those skilled in the art.

In the above-described first embodiment, the UE 100 determines, based on the control information from the eNB 200, whether or not the AP 300 which is the transmission source of the radio signal is operated by the specific NW operator; however, this is not limiting. The UE 100 may retain the identification information capable of identifying the network operator operating the eNB 200, in advance, and determine, based on the identification information, whether or not the AP 300 which is the transmission source of the radio signal is operated by the specific NW operator. The identification information may be stored in the memory in a user identity module (UIM) which is an IC card mounted into the terminal device configuring the UE 100.

In the above-described first embodiment, the eNB 200 need not execute the process in step S160. For example, the eNB 200 can omit, if, before step S160, the identifier of the AP 300 reported from the UE 100 is added to the table, the process in step S160.

In the above-described first embodiment, the eNB 200 may transmit, not to the AAA server 500, but to another network device included in the core network, the identifier of the AP 300. The eNB 200 may determine, based on the authentication result from the other network device, whether or not to add the identifier of the AP 300 to the table.

In the modification of the above-described first embodiment, a case of Logged MDT has been described, however, the above-described technique may be applied to an immediate report type MDT (Immediate MDT). It is noted that in the Immediate MDT, the UE 100 in the RRC connected state (connected mode) performs measurement according to the parameter configured from the network, and reports the measurement result and the location information to the network.

In the above-described second embodiment, the MME 400 has been described as an upper node of the eNB 200; however, the present application is not limited thereto. For example, the OAM (Operation and Maintenance) may execute a similar operation instead of the MME 400. Note that the OAM is a server apparatus that is present in the EPC 20 and managed by an operator. The OAM can perform maintenance and monitoring, etc. of the E-UTRAN 10.

In the above-described second embodiment, if a stealth AP is configured as the AP 300 to be reported, the UE 100 may transmit, based on the configuration, a request (probe request) for identification information related to the stealth AP; however, the present application is not limited thereto. The UE 100 may transmit a radio signal (probe request) for requesting the identification information of the AP 300 from a general AP. For example, the UE 100 may transmit, if the UE 100 cannot receive a radio signal (beacon signal) from the AP within a predetermined time, a radio signal for requesting the identification information of the AP 300. Therefore, the UE 100 may transmit the radio signal for requesting the identification information of the AP 300, if the UE 100 performs the so-called active scanning. Further, even if a stealth AP is not configured as the AP 300 to be reported from the eNB 200, the UE 100 may transmit the radio signal for requesting the identification information of the AP 300 (stealth AP).

In the above-described third embodiment, the WT 600 transmits, if the AP 300 is newly registered, the identification information of the AP 300 to the eNB 200; however, the present application is not limited thereto. The WT 600 may transmit, to the eNB 200, the identification information of the AP 300 excluded from the management target.

The WT 600 determines, for example, if the AP 300 is physically removed, that the AP is excluded from the management target. The WT 600 can determine that the AP is excluded from the management target, if the (identification information of the) AP 300 that is to be managed by the operator is deleted, or a response is not received from a subordinate AP 300.

If determining that the AP is excluded from the management target, the WT 600 can transmit, to the eNB 200, the identification information of the excluded AP 300. The eNB 200 may delete the identification information of the excluded AP 300 from the WT-AP table. The eNB 200 may delete the identification information of the AP 300 excluded from the WLAN list.

Further, the WT 600 may transmit, to the eNB 200, flag information indicating the added/deleted AP 300 (for example, Added: "0"/Deleted: "1") together with the identification information of the AP 300. Alternatively, the WT 600 may inform the eNB 200 of change information of the AP 300 managed by the WT 600 by using a first message including the identification information of the added AP 300, and a second message including the identification information of the deleted AP 300.

If the AP 300 is activated (for example, operation is started or operation is resumed), or deactivated (for example, operation is stopped due to power saving, breakdown, inspection, etc.), the WT 600 may transmit, to the eNB 200, the identification information of the AP 300. The WT 600 may inform the eNB 200 of an AP 300 that is activated (or deactivated), as the AP 300 that is added to (or deleted from) the management target.

Alternatively, the WT 600 may transmit the identification information of the AP 300 to the eNB 200 to inform the eNB 200 of the activated or deactivated AP 300.

In this case, the eNB 200 may exclude the deactivated AP 300 from the WT-AP table (and the WLAN list), and add the activated AP 300 to the WT-AP table (and the WLAN list). Alternatively, the WT-AP table may include an operation status column (for example, "Availability"), and the eNB 200 may update the WT-AP table by making a mark (for example, ON/OFF) on the operation status column in the WT-AP table. For example, the eNB 200 may mark the operation status column of the deactivated AP 300 as "OFF", and mark the operation status column of the activated AP 300 as "ON".

In the above-described fifth embodiment, a case in which the eNB 200-1 is a macro eNB and the eNB 200-2 is a small eNB has been described; however, the present application is not limited thereto. The eNB 200-1 may be a macro eNB, and the eNB 200-2 may be a small eNB. Further, the eNB 200-1 and the eNB 200-2 may have an equal relationship (for example, both may be macro eNBs). Further, the eNB 200-2 may be an HeNB. In such a case, the eNB 200-2 may transmit an inquiry to the eNB 200-1 via an X2-GW connected to the eNB 200-2.

In the description provided above, the WT 600 may be an AC (access controller) configured to manage (control) the AP 300, for example. The WT 600 may be an upper node of the AC, and may be a network apparatus configured to manage the AC.

Further, the operation according to the above-described embodiments and modifications may be combined and executed, where necessary. For example, the operation in the first embodiment may be executed in a system described in the second embodiment.

Although not particularly mentioned in the each above-described embodiment, a program for causing a computer to execute each process performed by any one of the above-described each node (the UE 100, the eNB 200, the AP 300, the MME 400, the WT 600 and the like) can be provided. Furthermore, the program may be recorded on a computer-readable medium. When the computer-readable medium is used, it is possible to install the program in a computer. Here, the computer-readable medium for recording the program may be a non-transitory recording medium. The non-transitory recording medium is not particularly limited. For example, the non-transitory recording medium may include a recording medium such as a CD-ROM or a DVD-ROM.

Alternatively, a chip may be provided which is configured by: a memory configured to store a program for performing each process performed by any one of the UE 100, eNB 200, and the AP 300; and a processor configured to execute the program stored in the memory.

In the each described-above embodiment, although an LTE system is described as an example of a mobile communication system, the present application is not limited to the LTE system and may be applied to a system other than the LTE system.

Note that the entire content of U.S. Provisional Application No. 62/165,315 (filed on May 22, 2015), Japanese Patent Application No. 2015-115163 (filed on Jun. 5, 2015), and Japanese Patent Application No. 2015-150173 (filed on Jul. 29, 2015) are incorporated in the present specification by reference.

The invention claimed is:

1. A base station, comprising:
a controller including a processor and a memory communicatively coupled to the processor, the processor configured to execute processes of:
receiving from a wireless LAN (WLAN) termination apparatus, a first message including a first list of identifiers of WLAN access points (WLAN APs), via an Xw interface between the base station and the WLAN termination apparatus, the first list of WLAN APs including an identifier of a WLAN AP added or deleted in the WLAN termination apparatus;
transmitting a second message to another base station, the second message including an identifier of the WLAN termination apparatus and a second list of WLAN APs associated to the WLAN termination apparatus; and
receiving from the another base station, an acknowledge message for the second message.

2. The base station according to claim 1, wherein the first list of WLAN APs includes the identifier of the WLAN AP added in the WLAN termination apparatus.

3. The base station according to claim 1, wherein the first list of WLAN APs includes the identifier of the WLAN AP deleted in the WLAN termination apparatus.

* * * * *